(12) United States Patent
Wilson et al.

(10) Patent No.: US 11,947,407 B1
(45) Date of Patent: *Apr. 2, 2024

(54) DATABASE AND FILE MANAGEMENT FOR DATA VALIDATION AND AUTHENTICATION

(71) Applicant: Federal Home Loan Mortgage Corporation, McLean, VA (US)

(72) Inventors: David M. Wilson, Centreville, VA (US); Ann Epstein, Vienna, VA (US); Kathleen W. Scanlon, Potomac, MD (US); David F. Owens, Broadlands, VA (US); Rajasekhar Penugonda, Ashburn, VA (US); Raghu Kurlagunda, Vienna, VA (US)

(73) Assignee: FEDERAL HOME LOAN MORTGAGE CORPORATION (FREDDIE MAC), McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,493

(22) Filed: Jan. 12, 2023

Related U.S. Application Data

(63) Continuation of application No. 16/728,362, filed on Dec. 27, 2019, now Pat. No. 11,579,955.

(51) Int. Cl.
*G06F 11/00* (2006.01)
*G06F 9/54* (2006.01)
(Continued)

(52) U.S. Cl.
CPC .......... *G06F 11/0727* (2013.01); *G06F 9/54* (2013.01); *G06F 11/0751* (2013.01);
(Continued)

(58) Field of Classification Search
None
See application file for complete search history.

(56) References Cited

U.S. PATENT DOCUMENTS

| 6,611,816 B2 | 8/2003 | Lebda et al. |
| 7,428,495 B2 | 9/2008 | Dhar et al. |

(Continued)

OTHER PUBLICATIONS

Google Scholar/Patents search—text refined (Year: 2023).*

(Continued)

*Primary Examiner* — Christopher S McCarthy
(74) *Attorney, Agent, or Firm* — MH2 TECHNOLOGY LAW GROUP, LLP

(57) ABSTRACT

A computer system, method, and non-transitory computer-readable medium are provided. A request including unauthenticated data is created and securely transmitted to a remote device, metadata corresponding to the request is updated to indicate successful validation, a response file is validated, and a discrepancy is detected between the unauthenticated data and the authenticated data. Correction data is obtained, and a transaction based on the request and the correction data is executed. A second processor of the remote device verifies that an unauthorized user has not modified the authenticated data, generates a database table based on one or more fields of the authenticated data, extracts one or more predetermined data values from the authenticated data and the database table, and validates the unauthenticated data in the request based on comparing the one or more predetermined data values from the authenticated data and the database table to the unauthenticated data in the request.

20 Claims, 8 Drawing Sheets

(51) Int. Cl.
   *G06F 11/07* (2006.01)
   *G06F 16/23* (2019.01)
   *G06F 16/958* (2019.01)
   *H04L 9/40* (2022.01)

(52) U.S. Cl.
   CPC ...... *G06F 11/0772* (2013.01); *G06F 16/2379* (2019.01); *G06F 16/986* (2019.01); *H04L 63/08* (2013.01); *H04L 63/123* (2013.01)

(56) References Cited

U.S. PATENT DOCUMENTS

| | | |
|---|---|---|
| 7,747,519 B2 | 6/2010 | Kemper et al. |
| 7,822,690 B2 | 10/2010 | Rakowicz et al. |
| 8,234,499 B2 | 7/2012 | Abraham et al. |
| 8,626,647 B1 | 1/2014 | Trimble, Jr. et al. |
| 10,572,653 B1 | 2/2020 | Semichev et al. |
| 2006/0242653 A1 | 10/2006 | Kostadinovich |
| 2008/0222028 A1 | 9/2008 | Santiago |
| 2012/0254945 A1 | 10/2012 | Reinertsen |
| 2020/0279255 A1 | 9/2020 | Douglas et al. |

OTHER PUBLICATIONS

Case Closed: eNotes Are Legal, 2012, Mortgage Industry Standards Maintenance Organization, Electronic Signature and Records Association, and American Land Title Association, pp. 1-6.

EMortgage 101, Tech.11 National Technology in Mortgage Banking Conference & Expo, Mar. 27-30, 2011, Hollywood-Fort Lauderdale, Florida, pp. 1-17.

Office Action issued in U.S. Appl. No. 16/728,362 dated Mar. 21, 2022, 14 pages.

Google Scholar/Patents search—text refined, Mar. 16, 2022 (Year 2022).

Office Action issued in U.S. Appl. No. 16/728,362 dated Jul. 25, 2022, 11 pages.

Google Scholar/Patents search—text refined, Jul. 18, 2022 (Year: 2022).

Notice of Allowance issued in U.S. Appl. No. 16/728,362 dated Nov. 9, 2022, 6 pages.

Google Scholar/Patents search—text refined, Nov. 2, 2022 (Year: 2022).

\* cited by examiner

DATABASE AND FILE MANAGEMENT FOR DATA VALIDATION AND AUTHENTICATION

CROSS REFERENCE TO RELATED APPLICATIONS

This application is a continuation application of U.S. patent application Ser. No. 16/728,362 filed Dec. 27, 2019, which is hereby incorporated by reference in its entirety.

FIELD OF THE DISCLOSURE

This invention relates to verifying information, and more particularly, to systems, methods, and programs for verifying information, including verifying the contents of electronic documents.

BACKGROUND

Managing highly confidential digital data can require implementing any number of digital security techniques, as well as any number of data validation techniques. When validating or verifying digital data, the authenticity of the digital data must be ascertained. In some examples, authenticated data can be stored in a data repository, while unauthenticated data received from an unknown source or an untrusted source can be validated based on the authenticated data. However, the authenticated data and the unauthenticated data can have different data formats, different data fields, different data types, and the like.

Moreover, digital information can be subject to manipulation by various unauthorized users. For example, an unauthorized user may attempt to modify authenticated data or assert that malicious data or forged data is authenticated data. Therefore, verifying the authenticity of data can prevent unauthorized users from executing instructions based on malicious data or forged data.

Accordingly, it is desirable to develop improved systems, methods and techniques for verifying that unauthenticated data received from an untrusted source matches authenticated data.

BRIEF SUMMARY

This disclosure provides embodiments of methods, systems, and articles of manufacture for database and file management. In some embodiments, a system for database and file management can include a data management device comprising one or more processors, and a memory device storing instructions that, in response to execution by the one or more processors, causes the one or more processor to perform operations including creating a request comprising unauthenticated data for validation. The operations can also include securely transmitting the request to a remote device and updating metadata corresponding to the request to indicate a successful validation by the remote device. Further, the operations can include receiving a response from the remote device. Furthermore, the operations can include validating the response file and detecting, from the response file, a discrepancy between the unauthenticated data from the request and the authenticated data accessible by the remote device. In addition, the operations can include obtaining correction data to resolve the discrepancy, verifying the correction data, and executing a transaction based on the request and the correction data. The remote device can include a second processor to perform operations that include applying a data security technique to verify that the authenticated data has not been modified by an unauthorized user, generating a database table based on one or more fields of the authenticated data, extracting one or more predetermined data values from the authenticated data, extracting one or more predetermined data values from the database table; and validating the unauthenticated data in the request based on a comparison of the extracted one or more predetermined data values from the authenticated data and the extracted one or more predetermined data values from the database table to the unauthenticated data in the request.

In some examples, the operation of securely transmitting the request to the remote device is performed using at least one of a representational state transfer (REST) application programming interface (API) or a simple object access protocol (SOAP). In some examples, the second processor is to further perform operations comprising generating the response file comprising the discrepancy based on a difference between the unauthenticated data from the request and the extracted one or more predetermined data values.

In some embodiments, the one or more processors perform operations further comprising generating a set of error code values corresponding to the validation of the unauthenticated data from the request, detecting an error from the validation of the response file, and selecting an error code from the set of error codes associated with the error.

In some examples, the request comprises data for multiple transactions. In some embodiments, the interpreted scripting language object comprises data stored in a JavaScript® object notation.

In another embodiment, a method implemented using a computing system for database and file management includes creating a request comprising unauthenticated data for validation. The method can also include securely transmitting the request to a remote device and updating metadata corresponding to the request to indicate a successful validation by the remote device. Additionally, the method can include receiving a response file from the remote device. Furthermore, the method can include validating the response file and detecting, from the response file, a discrepancy between the unauthenticated data from the request and the authenticated data accessible by the remote device. In addition, the method can include obtaining correction data to resolve the discrepancy, verifying the correction data, and executing a transaction based on the request and the correction data. The remote device can include a second processor to perform operations including applying a data security technique to verify that the authenticated data has not been modified by an unauthorized user, generating a database table based on one or more fields of the authenticated data, extracting one or more predetermined data values from the authenticated data, extracting one or more predetermined data values from the database table, and validating the unauthenticated data in the request based on a comparison of the extracted one or more predetermined data values from the authenticated data and the extracted one or more predetermined data values from the database table to the unauthenticated data in the request.

In yet another embodiment, a non-transitory computer-readable medium for database and file management can include a plurality of instructions that when executed by a processor cause the processor to perform operations including creating a request including unauthenticated data for validation. The operations can also include securely transmitting the request to a remote device and updating metadata corresponding to the request to indicate a successful validation by the remote device. Additionally, the operations can include receiving a response file from the remote device.

Furthermore, the operations can include validating the response file and detecting, from the response file, a discrepancy between the unauthenticated data from the request and the authenticated data accessible by the remote device. In addition, the operations can include obtaining correction data to resolve the discrepancy, verifying the correction data, and executing a transaction based on the request and the correction data. The remote device can include a second processor to perform operations including applying a data security technique to verify that the authenticated data has not been modified by an unauthorized user, generating a database table based on one or more fields of the authenticated data, extracting one or more predetermined data values from the authenticated data, extracting one or more predetermined data values from the database table, and validating the unauthenticated data in the request based on a comparison of the extracted one or more predetermined data values from the authenticated data and the extracted one or more predetermined data values from the database table to the unauthenticated data in the request.

It is to be understood that both the foregoing general description and the following detailed description are example and explanatory only and are not restrictive of the invention, as claimed.

Additional features, implementations, and embodiments consistent with the invention will be set forth in part in the description which follows, or may be learned by practice of the invention. The metes and bounds of the invention will be defined by means of the elements and combinations particularly pointed out in the appended claims.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DETAILED DESCRIPTION OF THE EMBODIMENTS

Figure 1:
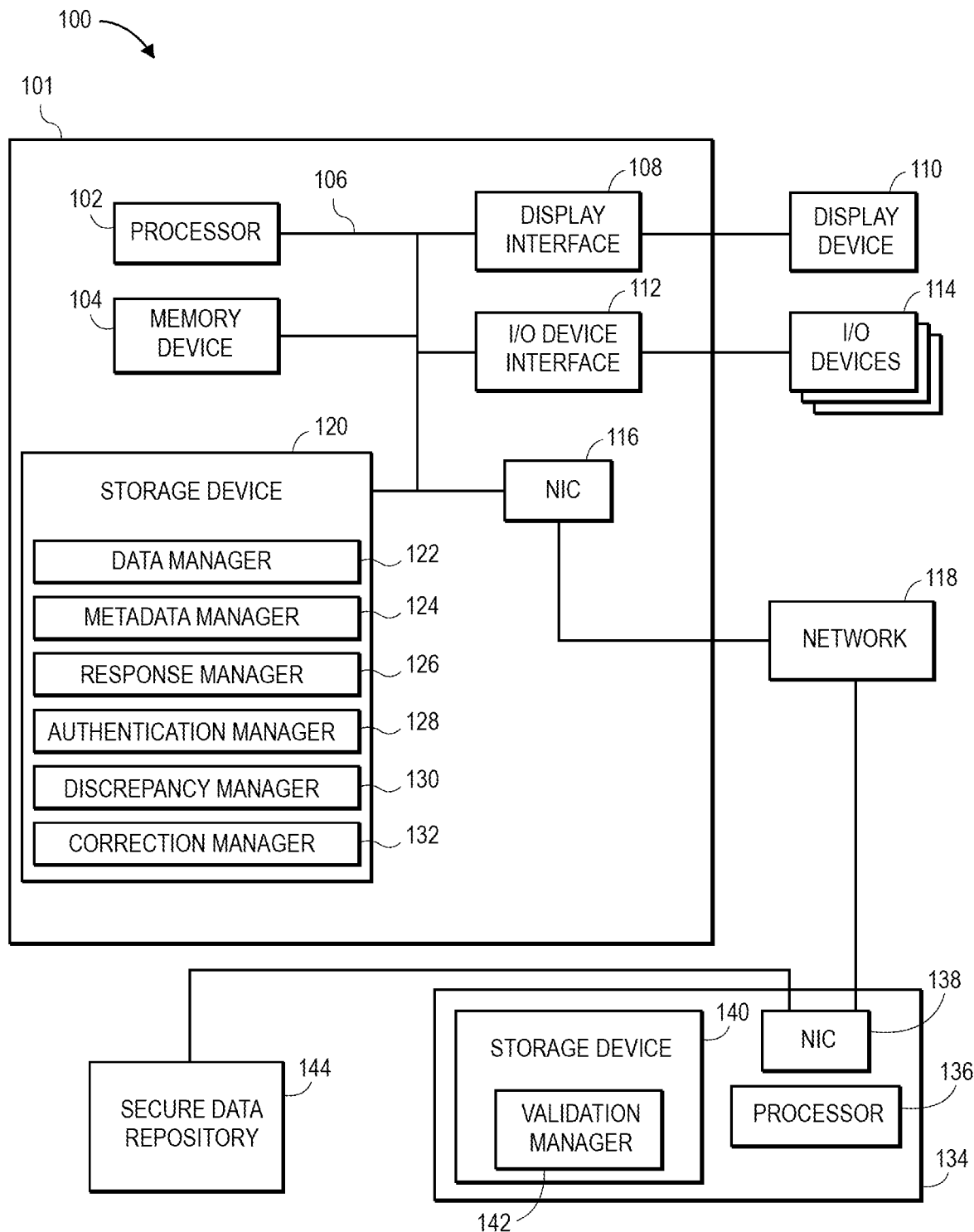
FIG. 1 is a block diagram of an example computing system for implementing systems consistent with embodiments of the invention.

Reference will now be made in detail to example embodiments of the invention, examples of which are illustrated in the accompanying drawings. Wherever convenient, the same reference numbers will be used throughout the drawings to refer to the same or like parts.

The techniques described herein include methods, devices, and computer-readable media for implementing computer applications, databases, and the like, to analyze incoming unauthenticated data from an unknown source, aggregate the unauthenticated data, and manage the unauthenticated data. In some embodiments, a computing device can implement various validation techniques to ensure that unauthenticated data from an unknown source matches authenticated data stored in a data repository, such as a database. For example, the validation techniques can include using a digital signature algorithm, any number of hash values, or the like, to transmit unauthenticated data to a certification service. In some embodiments, the certification service can validate that the authenticated data has not been tampered with or modified by an unauthorized user by calculating a first hash value of the received authenticated data and comparing the first hash value with the hash value of the authenticated data at the time of its creation. In some examples, the certification service can also determine validation rules used to validate unauthenticated data, such as the data fields of the unauthenticated data to be compared to the authenticated data. In some embodiments, the certification service can also return an acknowledgment to a computing device indicating if unauthenticated data matches authenticated data. The computing device can then execute any suitable number of instructions based on the previously unauthenticated data.

In some embodiments, the computing device and the certification device can use any number of digital security features to prevent an unauthorized user from validating unauthenticated data. For example, data transmission between a computing device and a certification service can implement a secure hash algorithm ("SHA") such as SHA-0, SHA-1, SHA-2, or SHA-3, among others. The techniques can also include implementing any other suitable cryptographic hash functions such as a digital signature algorithm based on modular exponentiation applied to a discrete logarithm problem. The cryptographic hash functions can provide message authentication so that a receiver can verify an origin of a message. Additionally, the cryptographic hash functions can provide data integrity so that a receiver can verify that a message has not been modified since the message was digitally signed. Furthermore, the cryptographic hash functions can provide non-repudiation to prevent a sender of data from falsely asserting that the message has been signed.

In some embodiments, the cryptographic hash functions can be used to transmit data between a computing device and a secure data repository, such as a database server. For example, the cryptographic hash functions can be used to transmit a request for authenticated data to a secure data repository and the secure data repository can return any suitable message, data, and the like, based on the authenticated data. The certification device can then validate unauthenticated data based on the received copy of authenticated data from the secure data repository. As discussed in greater detail below, validation of the unauthenticated data can include applying any number of validation rules, such as data formatting rules, to the unauthenticated data before determining if the authenticated data matches the unauthenticated data.

In some embodiments, a certification device can include a local secure data repository, which can improve a computing device by reducing the amount of data transmitted between a computing device and an external computing device. Accordingly, the techniques herein can reduce the bandwidth used for transmitting data between a computing device and a secure data repository. The techniques herein can also reduce the number of instructions executed by a processor of a computing system receiving unauthenticated data. For example, a certification device can process the validation of the unauthenticated data, which can enable a computing device to execute instructions for additional applications, hardware components, and external devices. Furthermore, the techniques herein can reduce the memory requirements of a computing system receiving unauthenticated data by storing authenticated data in a remote secure data repository or a certification device.

FIG. 1 is a diagram illustrating an example of a system, consistent with an embodiment of the invention. As discussed in greater detail below, the system 100 can collect and process data with any number of computing devices. In some embodiments, the system 100 can include a data management device 101 that includes a processor 102 that is configured to execute stored instructions, as well as a memory device 104 that stores instructions that are executable by the processor 102. The processor 102 can be a single core processor, or a multi-core processor, among others. The memory device 104 can include random access memory, read only memory, flash memory, or any other memory systems. The instructions that are executed by the processor 102 can implement the method 200 that collects and processes data as described below in relation to FIG. 2.

The processor 102 can also be linked through a system interconnect 106 (e.g. PCI®, PCI-Express®, etc.) to a display interface 108 configured to connect the system 100 to a display device 110. The display device 110 can include a built-in display screen or an externally connected display screen such as a computer monitor, television, and the like.

Additionally, the processor 102 can be connected through the system interconnect 106 to an input/output (I/O) device interface 112 configured to connect the monitoring device 100 to one or more I/O devices 114. The I/O devices 114 can include, for example, a keyboard, a mouse, a touchpad, and the like. The I/O devices 114 can be built-in components of the system 100 or the I/O devices 114 can be externally connected to the system 100.

In some embodiments, the processor 102 can be linked through the system interconnect 106 to a network interface controller (also referred to as a "NIC") 116 that is configured to connect the system 100 through the NIC 116 to a network 118. The network 118 may be a cellular network, a radio network, a wide area network (WAN), a local area network (LAN), or the Internet, among others.

In some embodiments, the processor 102 can also be linked through the system interconnect 106 to a storage device 120 that can include a hard drive, an optical drive, a USB flash drive, a solid state drive, or any combination thereof. In some examples, the storage device 120 can include any suitable number of applications and stored data that enable the system 100 to collect and process data. For example, the storage device 120 can include a data manager 122, a metadata manager 124, a response manager 126, an authentication manager 128, a discrepancy manager 130, and a correction manager 132. In some embodiments, the data manager 122 can detect data from any suitable source, such as a website, an external server, and the like. The data can include any suitable number of files, any number of sets of parameters, any number of data fields, and the like. In some embodiments, the received data is unauthenticated and the data manager 122 can process the unauthenticated data to validate the authenticity of the data. In some examples, as part of the data validation process, the data manager 122 can create a request based on an extensible markup language (XML) or an interpreted scripting language object, wherein the request comprises unauthenticated data for validation. The data manager 122 can also transmit the received unauthenticated data in a request to a remote device 134, such as a certification device for validation. The data manager 122 can also receive an acknowledgment of the data validation from the remote device. For example, the data manager 122 can receive an acknowledgment indicating that an extensible markup language ("XML") request or an interpreted scripting language object request has been successfully received by the remote device 134.

In some embodiments, a metadata manager 124 can update metadata corresponding to the XML or the interpreted scripting language object request to indicate the successful validation by the remote device 134. For example, the metadata manager 124 can store a local copy of the acknowledgment from a remote device 134. In some examples, the local copy of the acknowledgement indicates that the received data has been authenticated and is validated. In various implementations, the metadata can indicate if any number of unauthenticated data sets have been authenticated and validated.

In some embodiments, a response manager 126 can receive a response file based on XML or an interpreted scripting language object, such as a JavaScript® scripting language object ("JSON"). The response manager 126 can detect the response file from the remote device 134, wherein the response file includes any suitable validation data. For example, the response file can include the previously unauthenticated data, an identifier, any discrepancies between the unauthenticated data and the authenticated data of a secure data repository (not depicted), or any combination thereof. In some embodiments, the response file can also include a timestamp indicating when the request to validate unauthenticated data was received by the remote device 134, when the request was processed by the remote device 134, and/or when the response file was transmitted from the remote device 134 to the data management device 101.

In some embodiments, an authentication manager 128 can validate the response file. For example, the response file can be validated based on the data stored within the response file, a file structure of the response file, metadata corresponding to the response file, a system identifier, or the like. In some embodiments, a system identifier can authenticate the remote device 134 so that an unauthorized device is prevented from falsely transmitting an acknowledgment or response file to the data management device 101. In some embodiments, the system identifier can include any suitable alphanumerical string, or the like. In some examples, the system identifier is transmitted from the remote device 134 to the data management device 101 via a separate communication channel, such as an email, and the like. For example, during initialization of the data management device 101, the certification device 134 can transmit a system identifier to the data management device 101 through an email, an application, a web browser, or the like.

In some embodiments, a discrepancy manager 130 can detect a discrepancy between the unauthenticated data and the authenticated data based on the response file. For example, the response file from the remote device 134 can include any number of fields of received unauthenticated data that do not match the authenticated data of the secure data repository. The discrepancy manager 130 can also attempt to modify or correct any discrepancy in the unauthenticated data. For example, the discrepancy manager 130 can transmit a request for confirmation or approval of modifications to correct the discrepancies in the unauthenticated data as notified through the response file. In some examples, the discrepancy manager 130 can also transmit a request for corrected data to any suitable authorized external device (not depicted), authorized user, and the like. The discrepancy manager 130 can poll or transmit the request to the authorized external device or authorized user any number of times before terminating the attempts to obtain corrections to the unauthenticated data. In some embodiments, the discrepancy manager 130 can receive corrected information and/or approval of modifications to the unauthenticated data from the authorized external device (not depicted) or authorized user that corrects the discrepancy detected while validating the unauthenticated data. In various implementations, the response file can be updated by a correction manager 132 based on the corrected information from the authorized external device (not depicted) or authorized user.

In some embodiments, the correction manager 132 can receive the corrected data and execute a transaction based on the unauthenticated data request and the corrected data. For example, the correction manager 132 can execute a transaction to transmit the unauthenticated data and the corrected data, which may include generation of a new electronic document, to an external web service, application, computing device, or the like.

In some examples, the certification device 134 can receive the request for data validation, as well as any security related data, via any suitable interface, such as the NIC 116. The certification device 134 can be any suitable server, desktop computer, laptop computer, tablet device, and the like. The certification device 134 can include a processor 136, a NIC 138, and a storage device 140, among others. In some embodiments, the storage device 140 can include a validation manager 142 that can detect and store the requests to validate unauthenticated data received from the data management device 101. The validation manager 142 can also detect and store authenticated data that is associated with the unauthenticated data. For example, the validation manager 142 can detect an identifier corresponding to the unauthenticated data and search for a matching identifier in a storage device 140 accessible by the validation manager 142. In some embodiments, the validation manager 142 can retrieve a copy of the authenticated data associated with an identifier that matches an identifier of the unauthenticated data.

In some examples, the validation manager 142 can also aggregate authenticated data with multiple identifiers, authenticated data received from multiple systems, or the like. For example, unauthenticated data in a request may correspond to multiple sets of authenticated data associated with multiple identifiers.

In some embodiments, the validation manager 142 can validate the authenticated data stored in a secure data repository 144, which can include a database, a storage device, or the like. For example, the validation manager 142 can validate, verify, or otherwise determine that the authoritative copy of the authenticated data is stored in a secure storage device, such as storage device 140. In some examples, the validation manager 142 can apply a data security technique to the authenticated data. For example, the authenticated data can include a tamper seal associated with electronic document(s). The authenticated data can be electronically signed by two or more devices to generate a tamper seal (e.g., using a digital signature algorithm that generates a hash, as is known in the encryption and computer security arts) for the digital file containing the authenticated data. The tamper seal may include a date and time indicating when the authenticated data as electronically signed, and the seal may be used at any later time to detect whether the authenticated data was changed in any way after the seal was generated.

Furthermore, the validation manager 142 can validate the unauthenticated data received from the data management device 101 based on the authenticated data. As part of the validation, the validation manager 142 can standardize the received unauthenticated data to enable comparing the received unauthenticated data and the authenticated data. For example, the validation manager 142 can detect that the received unauthenticated data corresponds to a first data format, and the validation manager 142 can generate or transform the unauthenticated data into a second data format. The second data format can, in some examples, be the same data format as the authenticated data. In some implementations, the second data format can also apply any suitable standardization techniques so that the received unauthenticated data is converted to a second data format that uses the same data standards as the authenticated data. For example, data fields corresponding to text and/or numbers can be modified to match standardized data in a second data format. Data fields corresponding to addresses, names, titles, occupations, and the like, can be modified based on standardized abbreviations, punctuation, language related rules, and the like. Alternatively, the validation manager 142 can extract one or more predetermined values of the authenticated data to compare against the unauthenticated data.

In some embodiments, the validation manager 142 can transmit an acknowledgment and/or response file to the data management device 101 indicating if validation of the received unauthenticated data was performed with or without any issues, discrepancies, or errors. The acknowledgement and/or response file can indicate transmission errors between the data management device 101 and the certification device 134, discrepancies detected by the certification device 134, or invalidation errors based on unknown identifiers associated with the unauthenticated data.

It is to be understood that the block diagram of FIG. 1 is not intended to indicate that the data management device 101 or the certification device 134 are to include all of the components show in FIG. 1. Rather, the data management device 101 and the certification device 134 can include fewer or additional components not illustrated in FIG. 1. Additionally, the data manager 122, the metadata manager 124, the response manager 126, the authentication manager 128, the discrepancy manager 130, and the correction manager 132 can be partially, or entirely, implemented in hardware and/or in the processor 102. In some examples, the functionalities of the data manager 122, the metadata manager 124, the response manager 126, the authentication manager 128, the discrepancy manager 130, and the correction manager 132 can be implemented with logic that can include any suitable hardware, software, firmware, or any combination of hardware, software, and firmware. Moreover, the functionalities of the validation manager 142 can also be implemented with logic that can include any suitable hardware (e.g. processor 136), software, firmware, or any combination of hardware, software, and firmware.

Figure 2:
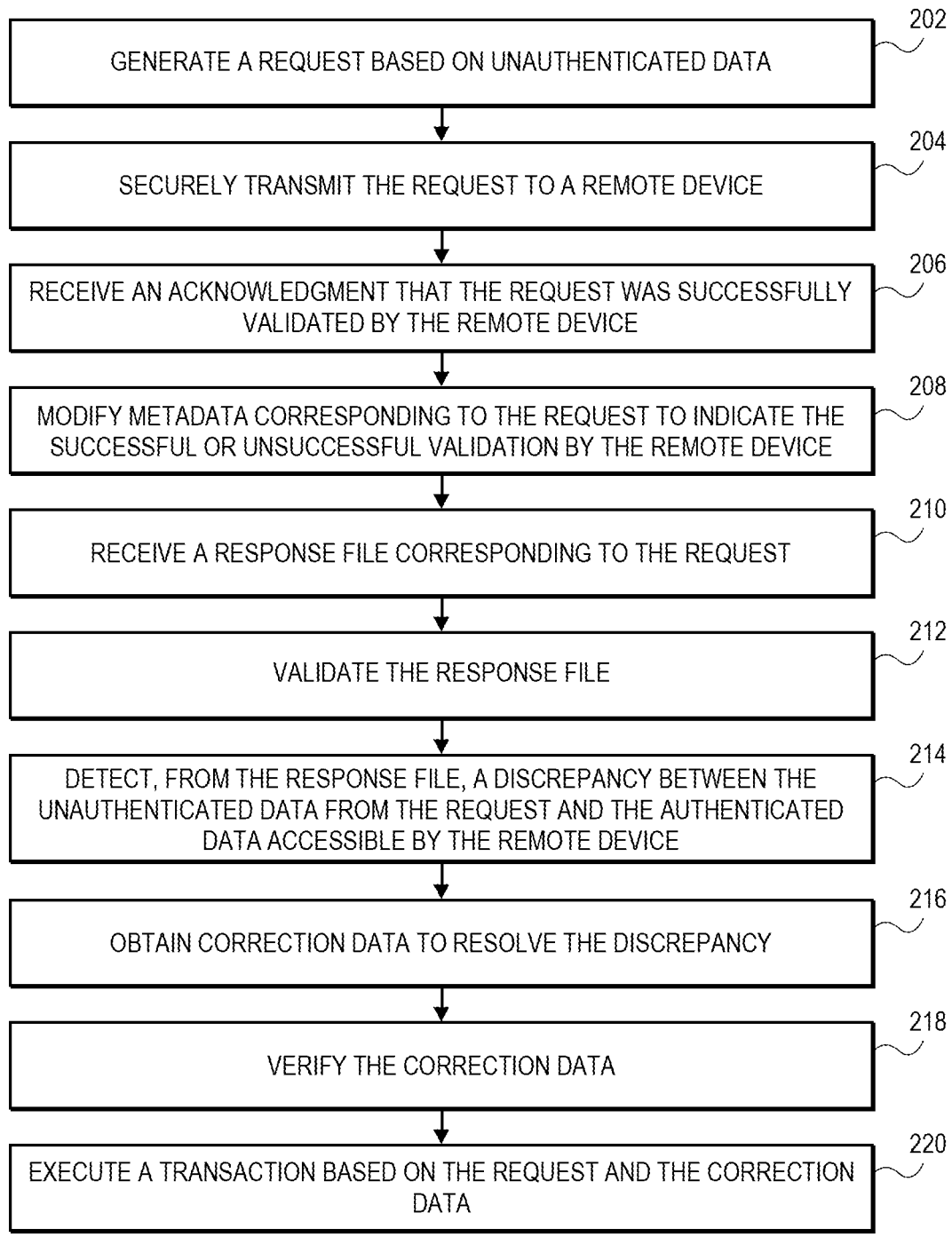
FIG. 2 is a flow chart of an example method for validating unauthenticated data with a data management device, consistent with embodiments of the invention.

FIG. 2 is a process flow diagram of an example method for database and file management. The method 200 can be implemented with any suitable number of computing devices, such as the data management device 101 of FIG. 1 and the certification device 134 of FIG. 1, among others.

At block 202, the method 200 includes generating, creating, or otherwise obtaining a request based on the extensible markup language (XML) or an interpreted scripting language object, such as JSON, among others. The request can be based on any unauthenticated data received from an unknown or unauthenticated source. In some examples, the request can correspond to unauthenticated data in an electronic document that needs to be validated prior to executing instructions with the electronic document. In some examples, the request can include data that needs to be authenticated, an identifier corresponding to the data that needs to be authenticated, a time stamp, and instructions for validating the data. In some examples, the instructions for validating the unauthenticated data can indicate data fields from the unauthenticated data to extract into database tables for comparison with the authenticated data of a secure data repository.

At block 204, the method 200 includes securely transmitting, providing, or otherwise sending the request to a remote device via a representational state transfer (REST) application programming interface (API), or any other suitable interface. In some embodiments, the request can be transmitted or provided to a remote device, such as a certification device, using a simple object access protocol (SOAP), among others. The application programming interface or protocol can enable exchanging structured information, such as the unauthenticated data, that pertains to a particular set of data or a set of files in a secure data repository. In some examples, the unauthenticated data can be transmitted via a hypertext transfer protocol (HTTP), or a simple mail transfer protocol (SMTP), which can enable web services executed and/or accessed by the certification device to transmit and/or receive the unauthenticated data.

At block 206, the method 200 includes receiving or obtaining an acknowledgment that the request was successfully received by the remote device. The acknowledgment can include any suitable set of characters that indicate the remote device, such as a certification device, has received the unauthenticated data of the request. In some embodiments, the acknowledgement can indicate a status code, a message, a certification request identifier, and/or a batch count, among others. In some examples, the status code can indicate whether the request has been received by the remote device. The message can indicate whether the request will be processed by the remote device. In various implementations, the certification request identifier can identify the unauthenticated data to be validated based on authenticated data. The batch count can, in some examples, indicate a number of different sets of unauthenticated data to be validated by the remote device as part of a request.

In some embodiments, the acknowledgment can also include various error codes that indicate the request was unable to be parsed, the batch count exceeds a predetermined limit, the request did not include a certification request identifier, or the request did not include unauthenticated data to be validated, among others.

At block 208, the method 200 includes updating, modifying, and/or storing metadata corresponding to the request to indicate the successful or unsuccessful validation by the remote device. As discussed below, a certification device can validate the unauthenticated data corresponding to the request. The validation can include generating a new copy of the unauthenticated data with a data format that matches the authenticated data stored in a secure data repository, determining a number of data fields of the unauthenticated data to be verified based on the authenticated data stored in the secure data repository, and/or verifying that the authenticated data of the secure data repository has not been modified or altered by an unauthorized transaction, among others.

In various implementations, the metadata can include any suitable alphanumeric string that indicates the certification device has validated the unauthenticated data. In some examples, the metadata can include one or more error codes indicating that a portion of the unauthenticated data, or all of the unauthenticated data was determined to be invalid. Additionally, the error code can indicate that a handshake error occurred between the data management device and the certification device, a data format error exists within the unauthenticated data, or a certification error exists.

At block 210, the method 200 includes receiving or obtaining a response file based on XML or an interpreted scripting language object. In some embodiments, the response file can include any discrepancies between the unauthenticated data and the authenticated data of the secure data repository, or the like. In some embodiments, the response file can also include a request identifier, a batch identifier, a status type, a certified by data value, a received date, a certified date, a certified time, an unauthenticated data identifier, an authenticated data identifier, a state date, a state type, or any combination thereof.

At block 212, the method 200 includes validating or verifying the response file. In some embodiments, the response file can be validated based on the data stored within the response file, a file structure of the response file, metadata corresponding to the response file, a system identifier, or the like. For example, verifying the response file can include authenticating, verifying, or comparing a system identifier. In some embodiments, the system identifier can include any suitable string of numbers and/or alphabetical characters that is unique to a certification device. In some examples, the system identifier can be transmitted from the certification device to the data management device separately or the system identifier can be included in the acknowledgment corresponding to the request. In some examples, the response file can also include any number of error codes indicating a certification file is not in an expected format, such as XML, an interpreted scripting language object notation, or JSON, among others. The error codes can also indicate whether the certification response file is empty, whether the response file does not include the results of validation for a batch of unauthenticated data in the request, or whether the credentials corresponding to the response file are incorrect, among other things.

In some examples, validating or verifying the response file can include determining that credentials used by the certification device are valid. These credentials are provisioned and stored in the data management device and are transmitted to the certification device by a separate transmission channel prior to the certification device validating unauthenticated data. For example, the separate transmission channel can be an email, a text message, a phone call, or the like.

At block 214, the method 200 includes receiving the response file, and detecting, or obtaining a discrepancy from the response file, wherein the discrepancy indicates one or more differences between the unauthenticated data from the request and the authenticated data accessible by the remote device. The discrepancy can include any number of data fields of the unauthenticated data that do not match or correspond to authenticated data stored in the secure data repository. In some embodiments, the discrepancies can be detected or obtained from the response file received from the certification device.

At block 216, the method 200 includes detecting, obtaining, or retrieving correction data from the response file. For example, the response file can include correction data such as suggested modifications to the unauthenticated data. The suggested modifications can correct for differences between the unauthenticated data and the authenticated data. For example, the suggested modifications can include revisions to text to match a predetermined format or standard, such as an address abbreviation, a date format, a numerical format, or the like. In some embodiments, the remote device can correct a data format of one or more fields of unauthenticated data, detect that data does not conform to a standardized format, or the like.

At block 218, the method 200 includes verifying correction data from the response file, wherein the verification can include transmitting the correction data to any suitable external device and/or user to verify that the correction data is accurate. In some examples, the external device and/or user can return approval of the correction data. Alternatively, the external device and/or user can return new data to be included in the request for validation of unauthenticated data. The new data can address the discrepancy between the unauthenticated data and the authenticated data. For example, the new data can include a new value for one or more data fields with discrepancies. The method 200 can return to block 202 and generate a new request based on the new data.

At block 220, the method 200 includes executing a transaction based on the previously unauthenticated data of the request and the verified correction data. In some embodiments, the transaction can include any suitable computer instruction that can transmit the validated data of the request to a requesting device or service, modify locally stored data based on the validated data from the request, encrypt locally stored validated data from the request, transmit the encrypted validated data from the request to a separate web service, or the like. In some examples, the validated data includes the previously unauthenticated data from a request that was validated by the certification device. In some embodiments, a database can be updated to indicate that a set of unauthenticated data has been validated. The validated set of data can be stored in the database, used by additional computer applications and/or services, or the like.

It is to be understood that the method 200 of FIG. 2 can include additional or fewer blocks. Furthermore, in some examples, the blocks of FIG. 2 can be implemented in any suitable order.

Figure 3:
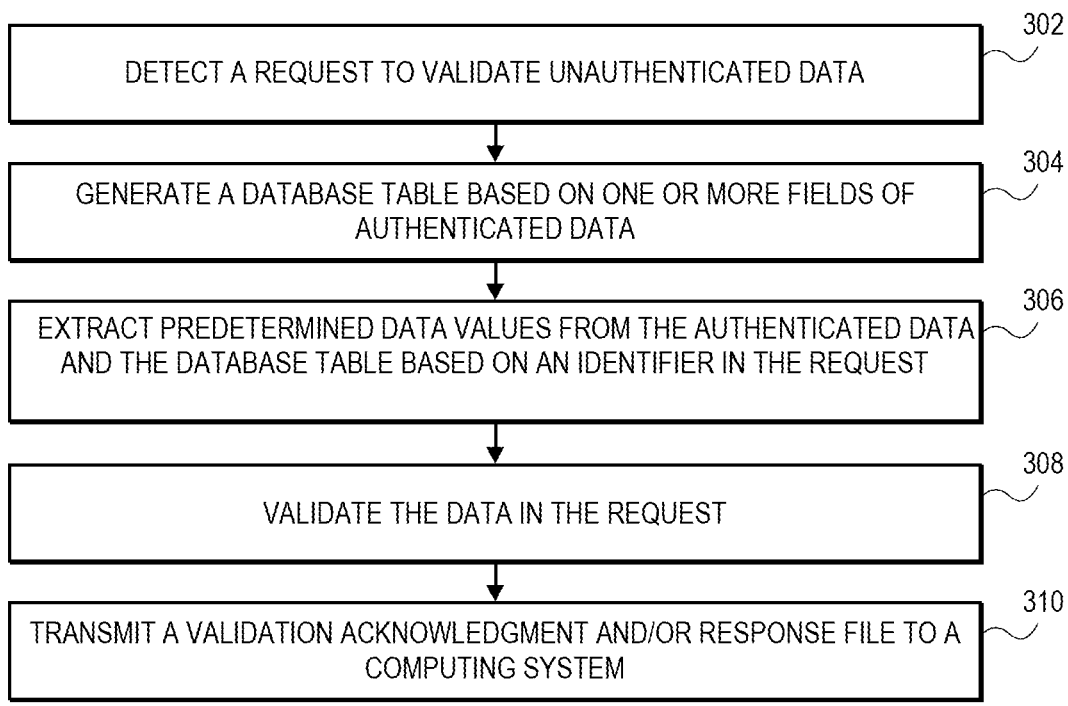
FIG. 3 is a flow chart of an example method for validating unauthenticated data with a certification device, consistent with embodiments of the invention.

FIG. 3 is a process flow diagram of an example method for validating data with a secure data repository. The method 300 can be implemented with any suitable computing device, such as the certification device 134 of FIG. 1, among others.

At block 302, the method 300 includes detecting or obtaining a request based on XML or an interpreted scripting language object. In some embodiments, the request provides the unauthenticated data received by a computing system that needs to be validated by the secure data repository. In some examples, the request can include an identifier corresponding to the unauthenticated data, validation rules, and the like. The validation rules are described in greater detail below in relation to block 308. In some embodiments, the request can be Mortgage Industry Standards Maintenance Organization ("MISMO") compliant, or an error can be generated for non-MISMO compliant requests.

At block 304, the method 300 includes generating a database table based on one or more fields of data of the authenticated data. In some embodiments, the database table is generated during an initialization period. For example, the database table can include any number of authenticated data values extracted from a first format of the authenticated data. The extracted data values can be stored, in some examples, in a second format that corresponds to a data format of expected requests. For example, the extracted data values can include a subset of data fields of the authenticated data, a reorganization of the data fields of the authenticated data, a modification applied to the authenticated data, or the like. In some embodiments, the extracted pre-determined values can include data values from an electronic document that are extracted and separated into a second data format associated with a database table, wherein the database table represents data to be compared to a second electronic document.

At block 306, the method 300 includes extracting or retrieving predetermined data values from the authenticated data. In some examples, the extracted data values can include data extracted from an XML document. The extracted data values can also include one or more fields of data from the database table based on an electronic document form identifier for authenticated data. In some examples, the one or more fields of data are extracted from the database table in response to detecting that the unauthenticated data corresponds to a type of electronic document, such as an electronic document that includes adjustable values, terms, rates, or the like. In some embodiments, a separate identifier can indicate the fields of data, sets of parameters, files, and the like, that correspond to the authenticated data. In some examples, the authenticated data is retrieved from any suitable secure data repository, such as an eVault described in greater detail below, based on the separate identifier received in the unauthenticated data. In some examples, the separate identifier can indicate an identification number, such as a mortgage identification number, among others.

At block 308, the method 300 includes validating the one or more fields of data in the request based on a comparison of the extracted one or more predetermined data values from the authenticated data and the extracted one or more predetermined data values from the database table to the unauthenticated data in the request. Verifying the data can also include, in some examples, validation rules that indicate whether any mismatches between unauthenticated data and the authenticated data stored in a secure data repository are acceptable, or determine non-essential data fields to exclude from the comparison of the unauthenticated data and the authenticated data of the secure data repository. For example, a first data field of unauthenticated data and a related second data field of authenticated data can include the same first letter and the data fields can be determined to frequently include abbreviations. In some embodiments, the two data fields can be considered a match or, alternatively, correction data can be requested to confirm that the two data fields match.

At block 310, the method 300 includes transmitting a validation acknowledgment and/or response file to a computing system such as a data management device. The acknowledgment can indicate any connection or handshake errors that occurred while receiving the unauthenticated data to be validated. In some examples, the response file can indicate if the unauthenticated data has been successfully validated based on data from the secure data repository. The response file can also indicate any discrepancies between the unauthenticated data and the data from the secure data repository.

It is to be understood that the method 300 of FIG. 3 can include additional or fewer blocks. For example, the method 300 can include applying a data security technique to verify that the authenticated data has not been tampered with or modified by an unauthorized user. In some examples, the data security technique can include calculating a first hash value of the received authenticated data and comparing the first hash values with the hash value of the authenticated data at the time of its creation. In some embodiments, the data security technique can include verifying that the data in the secure data repository is the authoritative copy, or the like, by confirming the identifying information of the remote device that manages the authenticated data, such as identifying information for a controller in a MERS eRegistry. Furthermore, in some examples, the blocks of method 300 of FIG. 3 can be implemented in any suitable order.

Figure 4:
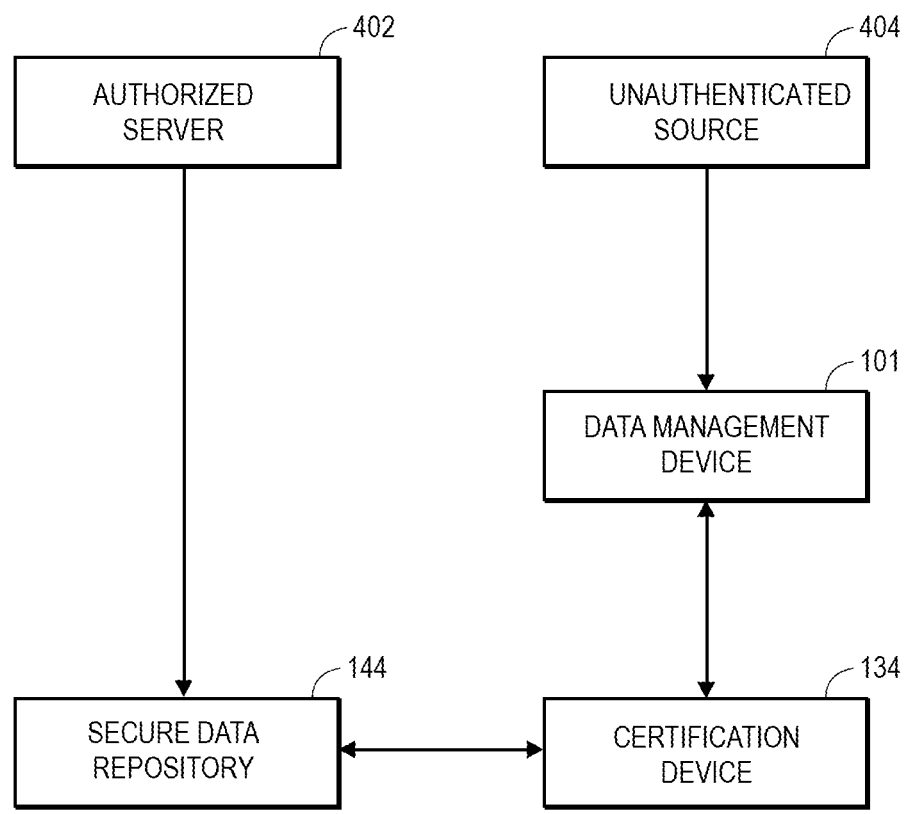
FIG. 4 is a block diagram of an example system for validating unauthenticated data, consistent with embodiments of the invention.

FIG. 4 is a process flow diagram of a system for validating unauthenticated data. In some embodiments, the system 400 can include any number of devices such as the data management device 101 and the certification device 134 of FIG. 1, among others.

In some embodiments, a secure data repository 144 can be initialized to store authenticated data or authoritative copies of data that are processed in accordance with predetermined security protocols, as discussed in greater detail below in relation to FIG. 5. In some examples, the secure data repository can receive the authenticated data from any authorized server 402. The authenticated data can include electronic documents, sets of data, parameters, or any combination thereof. In some examples, the authenticated data can be previously verified or validated based on any suitable digital security technique, and/or the authenticated data can be received from a trusted source.

Once the secure data repository 144 is populated with authenticated data, a data management device 101 can execute validation queries based on unauthenticated data from unauthenticated sources 404. The data validation requests or queries can be based on unauthenticated data received from any suitable unauthenticated source such as an external server, website, and the like. In some examples, the data validation requests are based on electronic documents received from an unauthenticated source 404. In various implementations, the data validation requests can correspond to one or more electronic documents or transactions. For example, the data validation requests can each process and validate a batch of electronic documents or unauthenticated data. The data of the electronic documents can be authenticated or validated based on the techniques described herein. In some embodiments, to enable the validation of the electronic documents, the data validation requests can include certification schedules, custodian data, or the like. The certification schedules can include a certification batch identifier, an originating identifier, an identifier corresponding to unauthenticated data, a name or alphanumeric string for originating device of the unauthenticated data, a state date, a state type, an electronic document type, such as an amortization type, an authenticated data identifier, a date for the unauthenticated data, a digital address or mailing/property address corresponding to the unauthenticated data, one or more data fields indicating various elements of the electronic document associated with the unauthenticated data, or any combination thereof.

In various implementations, the validation requests can be transmitted from the data management device 101 to a certification device 134 that can access authenticated data in the secure data repository 144. For example, the data management device 101 can generate data validation requests and transmit the data validation requests to the certification device 134. In various implementations, the data can be transmitted from a data management device 101 to a certification device 134 via any suitable interface, server, computing device, and the like. In some examples, an apigee ("API") gateway can transmit data from the data management device 101 to a certification device. An API gateway can serve as the single entryway into a system allowing multiple APIs or micro-services to act cohesively and provide a uniform experience. The API gateway can ensure reliable processing of every API call. In addition, the API gateway can provide enterprise-grade security and manage APIs centrally. In some embodiments, data can be transmitted via an access manager or a cloud based proxy and firewall that can route data traffic based on data security policies.

In some embodiments, the data validation by the certification device 134 can implement any suitable security technique, such as a tamper seal or digital signature, an authoritative copy check, or the like. In some embodiments, the tamper seal technique can include appending a digital signature or a system identifier to a request for validation of unauthenticated data. An authoritative copy check can include verifying that the timestamp of authenticated data stored in a secure data repository matches metadata of the last authorized modification to the authenticated data. In some examples, as discussed above, the validation can also include formatting the unauthenticated data to match a format of the authenticated data, generating database tables and any other suitable data structure for comparing the authenticated data to the unauthenticated data, and the like. In some examples, the certification device 134 can validate the unauthenticated data, or the data management device 101 can validate the unauthenticated data.

In various implementations, the certification device 134 can transmit an acknowledgment and/or response file indicating the validation results of the unauthenticated data to the data management device 101. The response file can indicate that the unauthenticated data matches the data stored in the secure data repository, the unauthenticated data does not match the data stored in the secure data repository, or a subset of required fields of the unauthenticated data match a subset of required fields of the data stored in the secure data repository.

In some embodiments, the response file can include any additional data such as discrepancy information, or data fields that do not match, etc. In some examples, the discrepancies can be resolved by polling an external authorized correction device (not depicted) or authorized user for information to resolve the discrepancy. In some embodiments, the response file can include one or more suggested revisions to the unauthenticated data that results in the unauthenticated data matching the authenticated data. For example, the revisions can include modifying terms in the unauthenticated data to be abbreviations. The response file can then be transmitted to an external authorized device or authorized user that can confirm whether the revision or modification to the unauthenticated data is accurate.

In some embodiments, the response file can also include any number of errors or error codes. In some examples, the data management device 101 can generate a set of error code values corresponding to the validation of the unauthenticated data from the request, detect an error from the validation of the response file, and select an error code from the set of error codes associated with the error.

The data management device 101 can update the locally stored information to indicate that the unauthenticated data, subject to revisions to address the discrepancies, is validated and authenticated. A transaction can then be executed by the data management device 101 based on the revised unauthenticated data. As discussed above, the transaction can include any computer-executable instruction that includes the revised unauthenticated data. Examples of transactions include instructions to transmit revised unauthenticated data to a web service or external device for comparing against the authenticated data, instructions to generate an electronic document that includes the authenticated data, instructions to modify locally stored data based on the authenticated data, or the like. In some embodiments, the transaction can include modifying a status or indicator of an electronic document to indicate if the authenticated data includes any issues, errors, and/or discrepancies.

It is to be understood that the block diagram of FIG. 4 is not intended to indicate that the system 400 is to include the data management device 101 and the certification device 134 as shown in FIG. 4. Rather, the system 400 can include fewer or additional components not illustrated in FIG. 4. For example, the data management device 101 and the certification device 134 can be implemented by one or more devices.

Techniques Directed to Managing Electronic Data

Today, most loans, including mortgage loans secured by real estate, are created using physical, paper legal documents, including a paper promissory note. More and more, however, paper loan documents are being replaced by electronic loan documents. As used herein, an electronic loan is a loan where the loan documentation exists solely in electronic form. That is, the legal loan document (e.g., the promissory note) is created, executed, transferred and stored electronically. In the real estate loan arena, an eMortgage is an electronic mortgage where the mortgage loan documentation exists solely in electronic form (although related ancillary documents may be paper).

The United States government passed the Electronic Signatures in Global and National Commerce Act into law in 2000, making eMortgages legally enforceable. Since that time, investors in the secondary mortgage market, who buy and sell mortgage loans (for example, the Federal Home Loan Mortgage Corporation, also known as Freddie Mac), have slowly adapted to investing in eMortgages in addition to paper-based mortgage loans.

An investor that purchases a paper-based mortgage loan becomes the legal holder of the paper promissory note that evidences the loan. The eMortgage equivalent of a paper promissory note is often referred to as an eNote—in general, an eNote contains the same information as a paper promissory note and has the same legal effect. An investor or other purchaser that buys an eMortgage becomes the legal "controller" of the eNote. Investors in paper-based loans typically used computerized investment systems to buy, sell, and generally manage the loans, and they have in place systems and techniques for verifying that the information contained in the paper legal loan documents is the same as the electronic information in their computerized investment systems. These paper-oriented verification systems and techniques, however, cannot be used for eMortgages and eNotes, which do not exist in paper form.

Accordingly, it is desirable to develop improved systems and techniques for verifying and certifying the information from eMortgages and eNotes that is used by computerized investment systems that buy, sell, and otherwise manage non-physical electronic loans.

Various embodiments consistent with the invention provide systems, methods, and computer program products for verifying that the electronic information describing an electronic loan corresponds to the information in the appropriate electronic loan documents and other authoritative loan information sources. For loan investors, (for example, purchasers in the secondary market for mortgage loans, such as Freddie Mac), buying eMortgages and accepting electronic delivery of associated eNotes may reduce the time and expense of delivering loans from the lender/originator/seller to the secondary market, compared to paper-based loans. Various embodiments consistent with the present disclosure may improve over paper-based loan document processing techniques by providing customized, automated electronic document review that is reliable and adaptable and that reduces the errors associated with the "stare and compare" techniques used for paper-based loan documents. Various embodiments consistent with the present disclosure may mitigate risk for the investor in eMortgages by evaluating the loan data as provided to the investor's computerized system with respect the corresponding electronic loan document data (e.g., eMortgage document data, such as the eNote data) and/or other authoritative sources of loan data and certify that the loan being delivered electronically is an accurate representation of the electronic loan documents executed at closing and authoritative electronic information from other sources.

In some embodiments, the unauthenticated data of a request described herein corresponds to an electronic mortgage document, and can include various data values used to validate the unauthenticated data and return a response file. For example, the request can include a note amount, a note rate percent, a scheduled first payment date, a loan maturity date, an initial principal and interest payment amount, a first name, a middle name, and a last name for a primary borrower and any number of secondary co-borrowers, a certification due date, or any combination thereof. The request can also include information for adjustable rate electronic documents. For example, the request can include a first rate adjustment effective date, an index source type, an index look back days value for an interest and payment adjustment lead days count, a margin rate percent, an interest rate rounded percent, a ceiling rate percent, and a per change maximum increase/decrease percent, among others.

Figure 5:
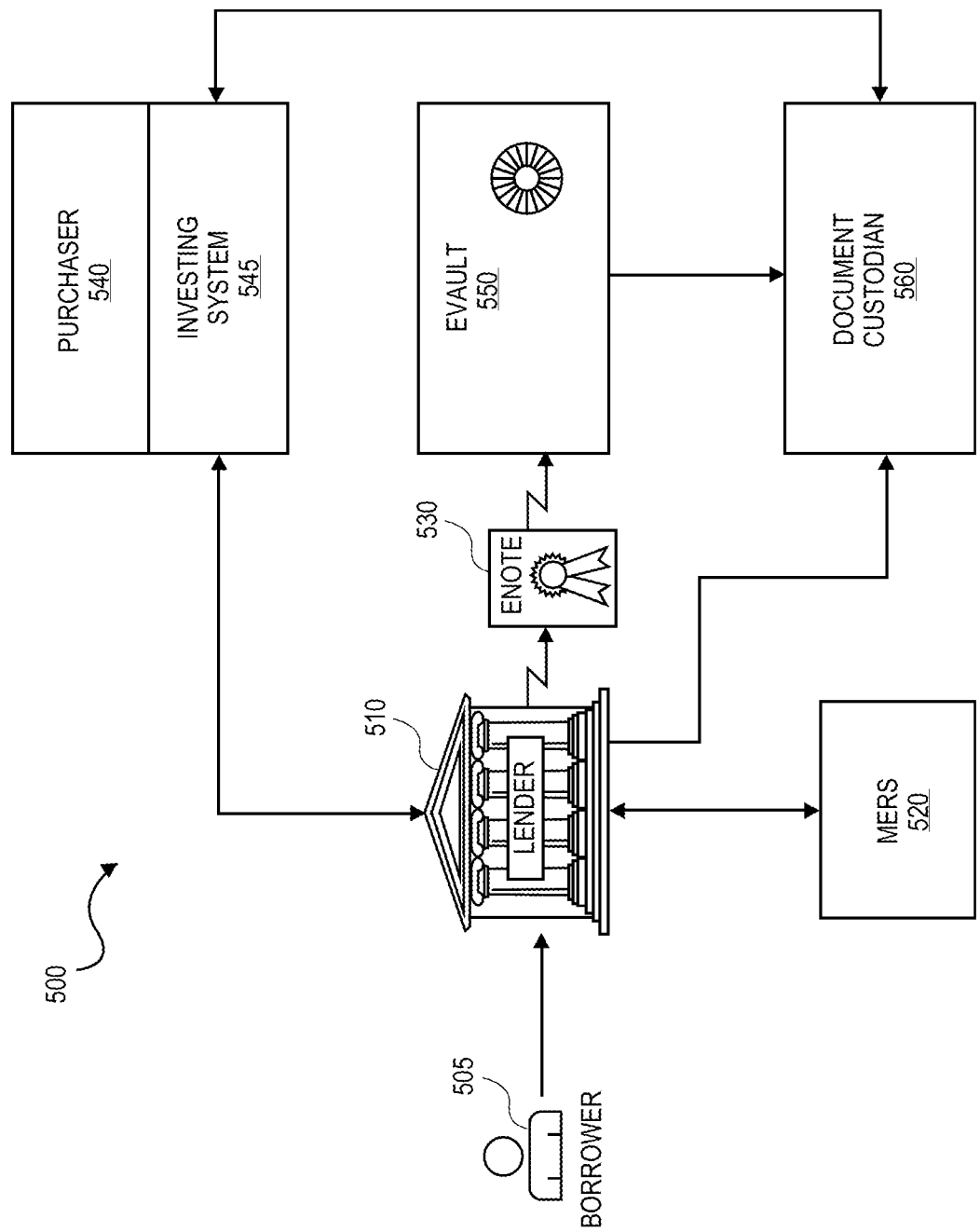
FIG. 5 is a block diagram of an example system for certifying electronic information, consistent with embodiments of the invention.

FIG. 5 is block diagram of an example system 500 for certifying loan information, consistent with embodiments of the invention. In the embodiment shown, a borrower 505 interacts with a lender 510 to take out an electronic loan. For secured loans, the borrower 505 may provide collateral using something of value that is owned by the borrower 505 or that is purchased with the loaned money, such as real estate, a car, a boat, stocks, bonds, or the like. In the case of a real estate loan interaction, the borrower 505 may provide information to the lender 500, and the lender 510 may enter that information into eMortgage electronic documents. Among other things, the information provided by the borrower 505 may include identification information (name information, address information, etc.), financial information (job information, pay information, bank account information, investment account information, etc.), collateral information (home being purchased information, car being purchased information, business being purchased information, etc.), and the like. In various embodiments, the lender 510 may be a financial institution, such as a bank, a savings and loan company, a stock brokerage, an automobile finance company, or the like.

In various embodiments, the lender 510 may perform an eClosing process or procedure, for example, utilizing a commercial eClosing system or the like, to create, execute, and transfer the eMortgage documents for the loan, including an eNote 530. As part of the eClosing process, the borrower 505 and the seller (not shown) may electronically sign and digitally seal various eMortgage documents. The eClosing creates the one legally enforceable copy of the eNote 530, which is called the authoritative copy, and which must be handled in a specialized manner (e.g., stored in an eVault, etc.), as is known in the art. In some embodiments, the eClosing process may create several electronic eMortgage documents, such as an electronic loan application document, an electronic federal closing disclosure statement and an electronic promissory note (e.g., eNote 530). In some embodiments, the eClosing process may create a mix of paper and electronic eMortgage documents, such as a paper loan application document, a paper federal closing disclosure statement and an electronic promissory note (eNote). In such embodiments, the paper documents may be scanned or otherwise converted into electronic documents for automated processing by computerized systems.

In various embodiments, the eClosing process places a tamper seal on the electronic document(s). For example, once the eNote 530 is electronically signed by the borrower and lender, a tamper seal is generated (e.g., using a digital signature algorithm that generates a hash, as is known in the encryption and computer security arts) for the digital file containing the eNote. The tamper seal may include a date and time indicating when the eNote was sealed, and the seal may be used at any later time to detect whether the eNote was changed in any way after the seal was generated.

In some implementations, the lender 510 may utilize a closing agent or settlement agent to perform the eClosing. The agent may perform tasks such as entering the borrower's information into an eClosing application program, supervising the electronic signature gathering, and tamper sealing the electronic documents, among other things.

As shown in FIG. 5, as part the lending process, the lender 510 may interact with the MERS® (Mortgage Electronic Registration Systems) eRegistry 520, which is a financial services industry utility that is owned and operated by MERSCORP Holdings, Inc., and that tracks ownership interests in eNotes. The MERS® eRegistry 520 includes a central database of all eNotes and identifies the current Controller (e.g., legal holder) and Location (e.g., eVault data storage) of the Authoritative Copy of each eNote. The MERS® eRegistry 520 registers eNotes, but it does not store them.

As part of the lending process, the MERS® eRegistry 520 generates a unique MIN (Mortgage Identification Number) for the electronic loan, which follows the electronic loan from registration to payoff. The MERS® eRegistry 520 supplies the MIN to the lender 510, such that the MIN appears in the electronic loan documents, including in the eNote 530. Also as part of the lending process and the registering process, information describing the eMortgage, including information from data fields of the eNote 530, may be accessibly stored by the MERS® eRegistry 520. For example, in addition to the MIN information, the MERS® eRegistry 520 may store information reflecting the eNote hash value (e.g., digital signature value), cross reference information (e.g., borrower 505's name and social security number, the property address, etc.), information identifying the current "controller" of the eNote 530 (i.e., information identifying the legal holder, such as the lender 510 at loan creation time), information identifying the current "location" of the eNote 530 (e.g., information identifying an eVault 550 that stores the eNote 530), eNote status information (e.g., paid off, charged off, converted to paper, converted to proprietary registry), and the like.

As shown in FIG. 5, when the eMortgage is closed, the lender 510 places the authoritative copy of the eNote 530 into an eVault 550. As noted above, information identifying eVault 550 is stored by the MERS® eRegistry 520 as the location of the eNote 530. In some embodiments, other eMortgage documents, in addition to the eNote 530, may be created at closing and transferred to, and stored in, the eVault 550, such as electronic loan application documents, electronic federal closing disclosure statement documents, and the like.

In various embodiments, the eVault 550 may be a computerized system that securely stores the eNote 530 in accordance with banking industry standards and applicable laws. In some embodiments, the provider of the eVault 550 may be required to meet qualifications set by a purchaser and/or the MERS® eRegistry 520, such as a minimum net worth, specific physical facilities, specific computer and software resources, specific legal status, etc.

As shown in FIG. 5, a purchaser 540, such as an investor or aggregator of loans (e.g., a financial institution such as Freddie Mac), may decide to purchase the electronic loan from the lender 510. In some scenarios, this purchase may be conditioned on compliance by the lender 510 with guidelines and terms of business specified by the purchaser 540. In general, mortgage loan purchasers 540 provide cash to the lender 510 and take originated mortgage loans off their books, which provide the lender 510 with the ability to make additional loans, which, in turn, increases liquidity in the loan market and helps keep interest rates low. In the case of mortgage loans, this makes homeownership and rental housing more affordable.

As shown by the communication path arrows in FIG. 5, the purchaser 540 exchanges information with the lender 510, including information to and from a computerized investing system 545 of the purchaser 540. In various embodiments, the purchaser 540 may communicate terms of business to the lender 510, which may include several criteria or requirements for creating an electronic loan that the purchaser 540 will buy, other than the terms of the loan itself. In such embodiments, the lender 510 must comply with the terms of business criteria or requirements in order for the purchaser 540 to buy the electronic loan. In various embodiments, the terms of business may include criteria from a standardized set of guidelines (e.g., the Freddie Mac "Single-Family Seller/Servicer Guide and eMortgage Guide") and criteria that are customized for and/or negotiated with a lender 510. For example, a customized term of business may be that the lender 510 makes an eNote 530 available for certification processing by a document custodian 560 within 24 hours of creation of the eNote. Another term of business may require eligible seller/servicers (e.g. lender 510) to choose from a list of approved eClose and eVault vendor providers.

In the embodiment shown in FIG. 5, the purchaser 540 utilizes the computerized investing system 545 to purchase the Mortgage from the lender 510. When the purchaser 540 buys the electronic loan (e.g., becomes the legal holder or owner of the eNote 530), the investing system 545 of the purchaser 540 receives the loan data, including data representing the eNote 530. In addition, the lender 510, through, e.g., MERS eDelivery, delivers the authoritative copy of the eNote 530 to the Purchaser's eVault 540.

Thus, at the beginning of the purchase process, the purchaser 540 is trusting, and the lender 510 is attesting, that the data received by investing system 545 from the lender 510 accurately represents the electronic loan—i.e., correctly describes the loan documents, including the eNote, and the circumstances associated with the transactions for the electronic loan, for example, that the loan was created in accordance with standard guidelines specified by the purchaser 540. The purchaser may also require the lender to conform with, and attest to, other criteria related to the electronic loan that are not reflected in information contained in the loan documents, such as various terms of business that the lender 510 has agreed to comply with in originating and/or selling the loan (e.g., that the lender has verified the borrower's employment with the borrower's employer, etc.).

Once the seller has transferred the attested loan data to the investing system 545, the purchaser 540 classifies the electronic loan as purchased, but not settled—the purchaser 540 has agreed to buy the electronic loan from the lender 510 and has received data representing the loan, but the purchaser 540 has not yet sent the purchase-price funds to the lender 510.

As shown by the arrows in the embodiment of FIG. 5, the investing system 545 also communicates with a document custodian 560, and the document custodian 560 communicates with the eVault 550 and has access to the eNote 530 contained in the eVault 550.

In various embodiments, the document custodian 560 is an entity that has a fiduciary responsibility to the lender 510 and the purchaser 540 and performs validation, verification, and/or certification functions on behalf of the purchaser 540, with respect to the loan that is being purchased by the purchaser 540. These functions may include validation and verification of the seller-provided data in the investing system 545 with respect to the information in the eNote 530 and/or other eMortgage documents associated with the loan. For example, the document custodian 560 may use a computerized system to compare specific fields, elements, or information in the loan data provided by the lender 510 to the corresponding fields, elements, or information in the eNote 530 for the electronic loan and either certify to the purchaser 540 that the loan data matches the corresponding data from the eNote 530 or report to the purchaser 540 that the data does not match.

The functions of the document custodian 560 may also include verification that the lender 510 complied with the guidelines and terms of business specified by the purchaser 540 in originating, creating, and/or selling the electronic loan. To determine whether the lender 510 complied with the terms of business, the document custodian 560 may receive the terms of business from the purchaser 540, gather information from the electronic loan documents, (e.g., timing information), and gather information from other sources, such as the MERS® eRegistry, the purchaser's (e.g., Freddie Mac's) delivery system and the custodian's eVault system 550; and then analyze the gathered information with respect to the terms of business to determine whether or not the lender 510 complied with each term.

In various embodiments, if the document custodian 560 certifies that the loan data provided by the lender 510 corresponds in essential aspects with the data from the eMortgage documents (e.g., the eNote 530) from the eVault 550, and/or certifies that the lender 510 complied with the purchaser's guidelines and/or terms of business, then the purchaser 540 may complete the loan-buying transaction by transferring the appropriate funds to the lender 510 on the settlement or closing date. At this point, the buying transaction is complete, and the purchaser 540 classifies the electronic loan as purchased. If, on the other hand, the document custodian 560 reports a mismatch, problem, discrepancy, or the like between the loan data provided by the lender 510 and the data from the eMortgage documents (e.g., the eNote 530) from the eVault 550 and/or non-compliance with the guidelines or terms of business, then the purchaser 540 may decline to complete the loan-buying transaction with the lender 510. In various implementations, after a failed certification, the transaction may be cancelled, the lender 510 may be given an opportunity to correct the problem(s), the lender 510 may not be able to deliver the electronic loan to the purchaser 540, or the purchase terms may be renegotiated, among other things.

One of ordinary skill will recognize that the components and implementation details of system 500 are examples presented for conciseness and clarity of explanation. Other components and implementation details may be used. For example, some or all of the communication paths shown in FIG. 5 may be secure, digital communication paths. For another example, more than one eVault 550 may be included in system 500 and the eNote 530 may be transferred between eVaults according to the directions of the changing owners (controllers) as it is bought and sold. In some embodiments, the lender 510 may have its own eVault that it uses to temporarily store eMortgage documents when they are first created at loan origination and before they are transferred to an eVault 550 specified by the purchaser 540 when the electronic loan is sold. Furthermore, in some implementations a single vendor may provide multiple eVaults for multiple different purchasers 540 and/or multiple different lenders 510.

For another example of a modification to system 500, the eVault 550 and the document custodian 560 may be combined in system 500 into a single entity performing both functions. For yet another example, the purchaser 540 and the document custodian 560 may be combined in system 500 in an embodiment where the purchaser 540 also performs the document custodian functions. For yet another example, there may be multiple document custodians 560 in system 500, and the purchaser may utilize any of them to perform verification and certification functions. For still another example, the seller of the eMortgage/eNote 530 is not limited to being the lender 510 that originated or created the eMortgage/eNote 530—the seller may be any party that currently owns the eMortgage/eNote 530, such as a purchaser 540 that previously purchased the eMortgage/eNote 530. Many other variations are possible.

Figure 6:
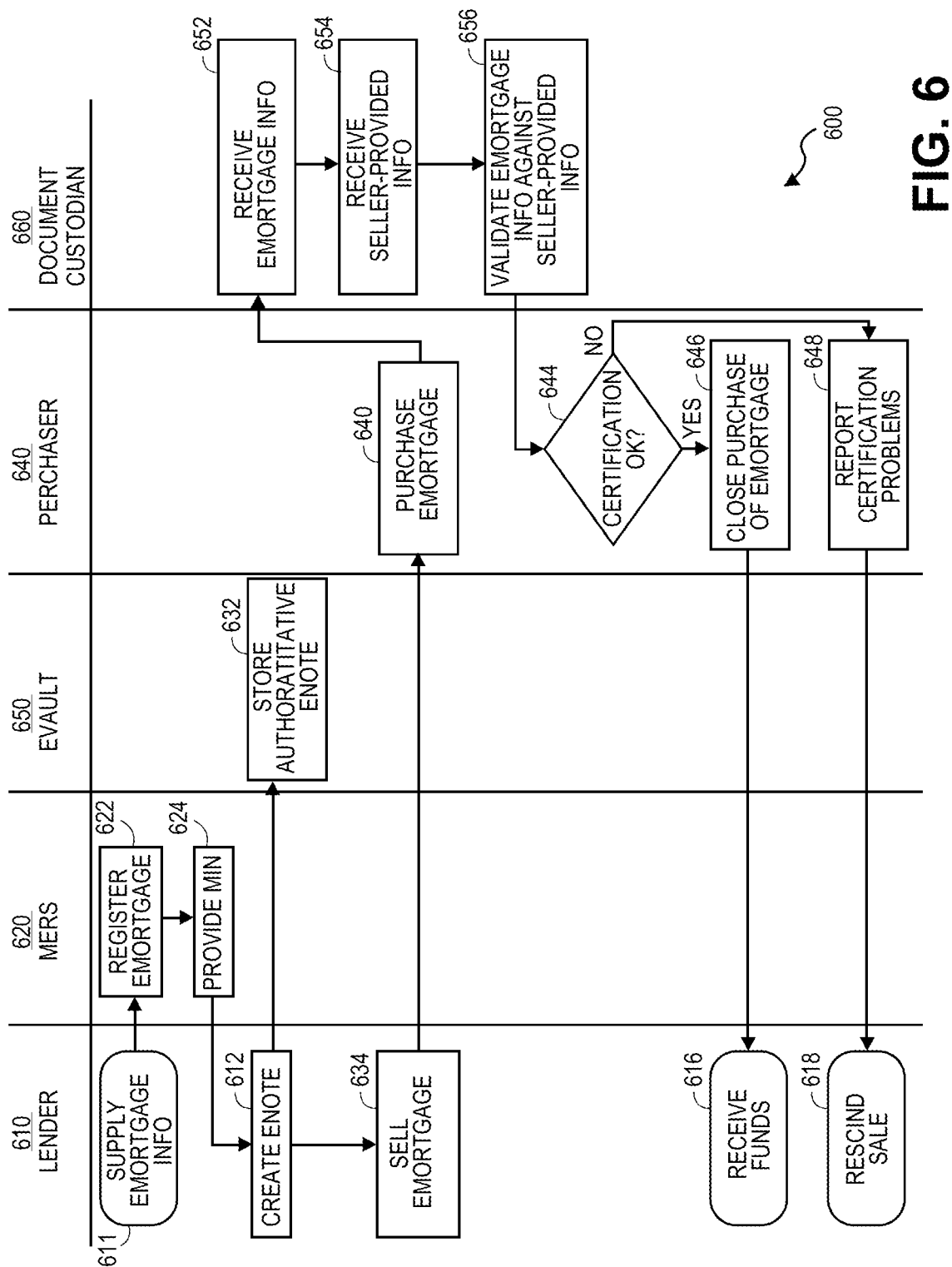
FIG. 6 is a swim lane flow chart of an example process for certifying electronic information, consistent with embodiments of the invention.

FIG. 6 is a swim lane flow chart of an example process for certifying loan information, including information in electronic loan documents, consistent with embodiments of the invention. In various embodiments, some or all of process 600 may be performed by software executing on a general purpose computing system (which may include one or more processors or one or more subsystems) managed by each entity 510-560, by circuits in a hardware-only system, or by a system that is a hybrid of the two. In various embodiments, a loan purchaser or loan investor, such as a government-sponsored entity (GSE) or a bank, may program, implement, and/or administer a computerized system that performs the functions of eVault 550, purchaser 540, and/or document custodian 560 and performs stages, or portions of stages from process 600 using means in addition to computing systems.

As shown, process 600 begins with a lender 510 supplying eMortgage information to the MERS® eRegistry 520 (stage 611). At stage 622, the MERS® eRegistry 520 registers the eMortgage, including the associated eNote, and creates a MIN for the eMortgage. At stage 624, the MERS® eRegistry 520 provides the MIN to the lender 510, which creates an eNote, including the MIN, for the eMortgage (stage 612).

At stage 632, an eVault 550 stores the eNote. In some implementations, the eVault 550 may be an eVault associated with the lender 510 and used to temporarily store eNotes until they are sold. In other implementations, the eVault 550 may be associated with a purchaser 540 that has arranged beforehand to purchase the eMortgage from the lender 510 upon closing and that has directed the lender 510 to use a specific eVault 550. In various embodiments, stages 611-632 may be part of an eClosing procedure.

At stages 634 and 640, the lender 510 sells, and a purchaser 540 buys, the eMortgage. In various embodiments, stages 634 and 640 are the initial stages of a purchase process (e.g., stages 634-616) wherein the lender 510 transfers data describing the eMortgage to the purchaser 540, but the purchaser 540 does not pay for the eMortgage until the data is certified as being an accurate representation of the eMortgage documents, including the eNote, and the eMortgage origination.

At stage 652, a document custodian 560 receives eMortgage information. In various embodiments, eMortgage information is authoritative information that comes from the original electronic loan documents, including the eNote, which are typically electronic documents, but which could possibly include some information from paper documents that are part of a hybrid eMortgage (e.g., a paper federal closing disclosure statement). In various embodiments, the document custodian 560 is an entity engaged by the purchaser 540 to verify the eMortgage data provided by the lender 510 against the information in the actual eMortgage documents and/or against information about the eMortgage from other sources. In various embodiments, the document custodian 560 may receive eMortgage information from the eVault 550, where the authoritative copy of the eNote is stored (e.g., from stage 632). In some embodiments, the document custodian 560 may receive eMortgage information, perhaps in the form of non-authoritative copies of electronic documents (e.g., a non-authoritative copy of the eNote), from the lender 510, from the eVault 550, from the purchaser 540, from the MERS® eRegistry 520 or from some other source.

At stage 654, the document custodian 560 receives the seller-provided information describing the eMortgage. In various embodiments, the document custodian 560 may receive the seller-provided information from the purchaser 540, where the purchaser previously received the information from the seller (e.g., stage 634, wherein the lender 510 may have uploaded eMortgage information to the purchaser's computerized investing system). In such embodiments, the document custodian 560 may receive the seller-provided information as data exported from the purchaser's investment system in XML format, for example, in an XML file with named data fields. In some embodiments, the document custodian 560 may receive the seller-provided information directly from the seller (e.g., from the lender 510 in the embodiment shown), where the seller provides to the document custodian 560 a copy of the eMortgage information that the seller uploaded to the investing system of the purchaser 540.

At stage 656, the document custodian 560 validates the eMortgage information against the seller-provided information. For example, the document custodian 560 may verify that some or all of the data in the authoritative copy of the eNote corresponds to (e.g., is substantially the same as) the corresponding data in the seller-provided information supplied to the purchaser 540 by the lender 510. In some embodiments, the document custodian 560 may verify the data in a subset of fields from eMortgage documents, where the subset of fields may be specified by the purchaser 540. In various embodiments, the document custodian 560 may output an XML file containing the validation results that is uploaded to the computerized investing system of the purchaser 540.

As a result of the analysis in stage 656, if the document custodian 560 determines that the eMortgage information matches or corresponds to (e.g., is materially the same as) the seller-provided information and meets or corresponds to (e.g. substantially complies with) any and all standards, conditions, and certification criteria required by the purchaser 540, then the document custodian may output a certification to the purchaser 540 indicating that the seller-provided information and the electronic loan are satisfactory. If, on the other hand, the document custodian 560 determines that the seller-provided information and/or the electronic loan does not meet the certification criteria, then the document custodian 560 may output a non-certified result to the purchaser 540.

In various embodiments, stage 656 may perform analyses to determine that the seller-provided information does not meet the certification criteria because the data from eMortgage documents (e.g., the eNote) does not match the corresponding seller-provided information. For example, the note interest rate from the eNote may not match the note interest rate in the seller-provided information, the monthly payment due date from the eNote may not match the monthly payment due date in the seller-provided information, the MIN number from the eNote may not match the MIN number from the seller-provided information, etc. In various embodiments, the document custodian 560 may output a non-certified result to the purchaser 540 that includes a reason(s) for the non-certification, such as "MIN number from the eNote does not match MIN number from the seller-provided information," or the like. In general, the causes of discrepancies between the seller-provided eMortgage information and the corresponding information from the definitive eMortgage documents (or other sources) may range from simple typographical errors in the seller-provided information to fraudulent data provided by a seller to induce purchase of a loan that the purchaser would not otherwise purchase.

At stage 644, the purchaser 540 determines whether or not the document custodian 560 has certified that the seller-provided loan data satisfactorily compares to the eMortgage information. In various embodiments, as mentioned above, the document custodian 560 may provide a certification or non-certification result to the purchaser 540, which is consulted by this stage.

If the certification is satisfactory (stage 640, yes), then the purchaser closes the purchase of the eMortgage from the lender 510 (stage 646). In various embodiments, closing the purchase may include sending funds in the amount of the purchase price to the lender 510, and process 600 ends when the lender 510 receives the funds (stage 616).

If, on the other hand, the certification result is unsatisfactory (stage 640, no), then the purchaser reports the certification problem(s) to the lender 510 (stage 648). In such a case, the sale may be rescinded by the lender 510 and process 600 ends (stage 618).

In other implementations (not shown), stage 618 may be replaced with stage(s) that correct the certification problems. For example, in some embodiments, if the data from an eMortgage document (e.g., the eNote) does not match the seller-provided information from the lender 110, then: 1) if the problem is a minor data entry error in the seller-provided information (e.g., a typographical error in an address), then the document custodian 160 may identify or suggest an appropriate correction to the seller 110, and the seller 110 may correct the minor problem and complete the sale; or 2) if it's a significant data entry error in the seller-provided information (e.g., a typo in an interest rate, or loan term) then the document custodian 160 may identify or suggest an appropriate correction to the seller 110 and/or the purchaser 140, and the seller 110 and/or the purchaser 140 may correct the significant problem and revise the sale/purchase of the electronic loan according to the corrected data (which may involve adjusting the buying price from the original price that was based on the inaccurate date) (i.e., the loan would be redelivered). If the problem is uncorrectable—for example, if the eNote and/or business procedures and terms associated with the eMortgage have a problem that renders the eMortgage unpurchasable by the purchaser 140, (e.g., an eNote that is ineligible for purchase because the ENote has the wrong property address in it)—then the purchaser 140 will not close on or purchase the electronic loan, and the loan will remain (or revert back to) the property of the lender 110. In some situations, such as an incorrect property address in the eNote, the lender 110 may cure the problem separately, perhaps generating a new or corrected eNote, and then sell the eMortgage with the new/corrected eNote to the purchaser 140 in a separate, later transaction.

In accordance with these examples, the parties in process 600 may have an opportunity to correct minor errors in the seller-provided information and complete the sale, or to cancel the current sale, correct material errors, and then initiate a new sale under different terms that take into account the corrected errors. Other variations are possible.

Figure 7:
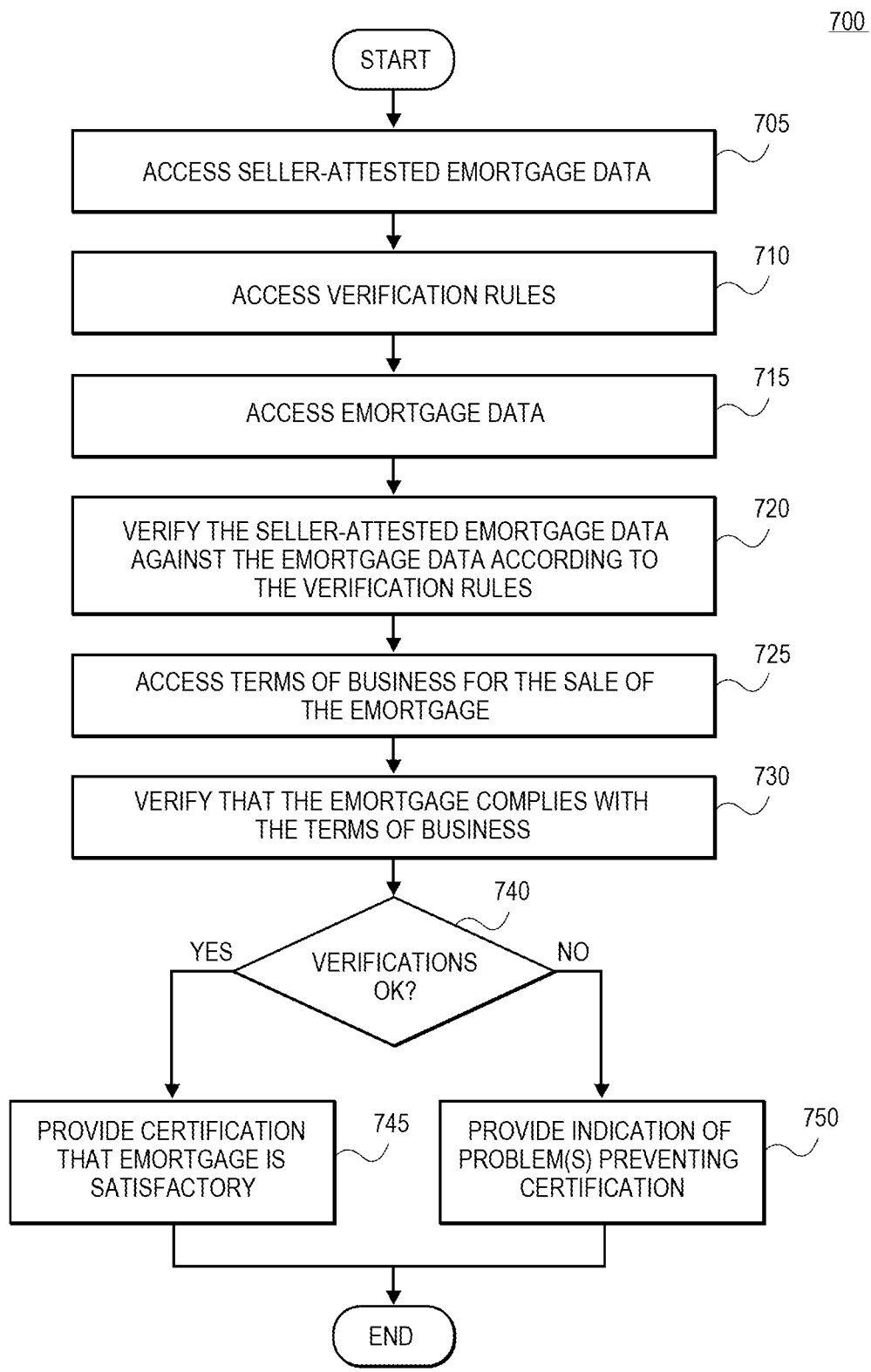
FIG. 7 is a flow chart of an example process for certifying electronic information, consistent with embodiments of the invention.

One of ordinary skill will recognize that example process 600 is presented for conciseness and clarity of explanation and that stages and entities may be added to, deleted from, reordered, or modified within process 600 without departing from the principles of the invention. For example, the purchaser 140 and document custodian 160 entities may be combined, such that stages 640-648 are performed by the combined entity. For another example, the lender 110 may be replaced by a seller that currently owns the eMortgage, but did not lend the money to originate the eMortgage, and in such an embodiment, stages 611-624 may be eliminated from process 200. Other variations are possible FIG. 7 is a flow chart of an example process 700 for certifying loan information, consistent with embodiments of the invention. In various embodiments, some or all of process 700 may be performed by software executing on a general purpose computing system (which may include one or more processors or one or more computing subsystems), by a hardware-only system, or by a system that is a hybrid of the two. In various embodiments, a guarantor, such as a GSE or a bank, may implement, program, and/or otherwise administer a system that performs process 700, including performing stages, or portions of stages from process 700 using other means in addition to computing systems.

In the embodiment shown, process 700 begins with accessing seller-attested eMortgage data (stage 705). In some embodiments, a document custodian, such as the document custodian 560, may access the seller-attested eMortgage data by receiving, requesting, downloading, accepting or otherwise obtaining a copy of the eMortgage data from a computerized system, including the investing system 545 of the purchaser 540 of the eMortgage, to which the seller previously uploaded the seller-attested eMortgage data. In various embodiments, the seller-attested eMortgage data may be data, (e.g., digital data), that describes, represents or otherwise corresponds in essence to an eMortgage, and that the seller of the eMortgage attests or otherwise guarantees is accurate. In some embodiments, the seller-attested eMortgage data may include data that describes, represents or otherwise corresponds in essence to the terms of business utilized or followed by the seller to create and/or sell the eMortgage. With respect to the embodiment shown in FIG. 5 as an example, the data uploaded by the lender 510 into the investing system 545 of the purchaser 540 may be seller-attested eMortgage data.

At stage 710 of FIG. 7, process 700 accesses verification rules. In some embodiments, a document custodian, such as the document custodian 560, may access the verification rules by receiving, requesting, downloading, accepting, or otherwise obtaining a copy of the verification rules from the purchaser of the eMortgage, such as the purchaser 540 of the eMortgage shown in FIG. 5. In various embodiments, the verification rules may be rules, steps, procedures, or data that describe or specify at least which fields, attributes or portions of the seller-attested eMortgage data need to be verified or validated. In various embodiments, the verification rules may also describe how to verify the eMortgage data. For example, in some embodiments, the verification rules may specify which fields or attributes of the seller-attested eMortgage data should be compared to, or verified with respect to, the corresponding fields or attributes of the eMortgage documents or other eMortgage data source. With respect to the embodiment shown in FIG. 5 as an example, the investing system 545 may export to the document custodian 560 a list of fields or attributes in the seller-attested eMortgage data and/or in the eNote that are required to be checked in order for the eMortgage to be certified as purchasable. In some such embodiments, the verification rules received by the document custodian 560 may be in XML format.

For instance, in some embodiments, the verification rules may specify that the following data items are certifiable fields that the document custodian must verify are correctly set in the seller-attested data and/or, where appropriate, must match or otherwise comport with the corresponding information from the eMortgage document(s) (e.g., the eNote) or from some other eMortgage data sources (e.g., the MERS® eRegistry, paper mortgage documents, etc.):

1) The seller-attested data reflects that the promissory note is an eNote;
2) The seller-attested data reflects the correct MIN for the eMortgage as shown in the eNote;
3) The tamper seal on the eNote matches the tamper seal stored in the MERS® eRegistry;
4) The purchaser is listed as the Controller of the eNote and the document custodian is registered as the Location Organization of the eNote;
5) The eNote includes an Electronic Signature that includes the borrower's name, the date and time of the Electronic Signature, and the legal capacity in which the borrower signed;
6) MERSCORP Holdings, Inc. is named as the "Operator of the Registry" in the eNote;
7) The seller-attested data reflects the purchaser's loan number, as does the MERS® eRegistry and the eNote;
8) If the eNote has been modified, the MERS® eRegistry reflects the modification; and
9) The eNote complies with a recognized electronic document standard, such as compliance as a version 1.02 Mortgage Industry Standards Maintenance Organization (MISMO) category 1 Smart Document.

In some embodiments, the verification rules may specify a variable set of data items or data fields from the eNote as certifiable fields, where the variations depend on the type of electronic loan (e.g., a fixed-rate loan, an adjustable-rate mortgage loan (ARM), etc.). For instance, there may be 13 data fields to check for a fixed-rate loan, and 22 data fields to check for an adjustable-rate loan. Additional examples of data fields that the verification rules may specify for verification of the seller-attested eMortgage data against the eNote data include:

1) Document Custodian number;
2) Property address;
3) Original note rate;
4) First payment due date;
5) Payment amount (P&I)—tolerance of 1 cent;
6) Payment amount (Interest Only loan)—payment tolerance=payment must be equal or less than the payment stated on the note, within one cent;
7) Amortization type;
8) Mortgage loan type;
9) Original mortgage loan amount (tolerance of 1 dollar);
10) Original term (in months);
11) Balloon maturity date;
12) Interest only end date (if applicable);
13) MIN number;
14) Interest rate floor (if loan is an ARM);
15) Interest rate ceiling (if loan is an ARM);
16) Mortgage margin (if ARM);
17) First interest rate change date (if ARM);
18) First payment change date (if ARM);
19) Look-back period (if ARM);
20) Index rounding feature (if ARM);
21) Borrower(s) name(s);
22) Signatures for borrowers are present and validated (electronic signature);
23) Hash value (digital seal or digital signature) must match that registered with MERS® eRegistry;
24) Maturity date; and
25) Periodic cap.

At stage 715, process 700 accesses the eMortgage data. As mentioned above, the eMortgage data may be authoritative information from one or more trusted source(s) that describes or is otherwise related to the eMortgage, such as electronic eMortgage document(s) (e.g., the eNote 530, an electronic federal closing disclosure statement, etc.), data stored in the MERS® eRegistry regarding an eNote, data stored in some other digital repository (e.g., an eVault, a computing system of a document custodian, a computing system of a lender or seller, etc.) reflecting the loan process, paper loan documents, etc. In various embodiments, the eMortgage data may also include authoritative information describing or representing the terms of business, business processes, business procedures, standard business guidelines, and the like that were utilized to create the eMortgage.

In some embodiments, a document custodian, such as document custodian 560, may access the eMortgage data by receiving, reading, requesting, downloading, accepting, or otherwise obtaining access to the eNote 530 stored in an eVault 550; by receiving, reading, requesting, downloading, accepting, or otherwise obtaining access to data related to an eNote from the MERS® eRegistry 520; by receiving, reading, requesting, downloading, accepting, or otherwise obtaining access to data related to an eMortgage from the lender 510 or other seller (e.g., terms of business data, a copy of the eNote, etc.); by obtaining copies or images of paper loan documents from a paper document custodian; or by some other means.

At stage 720, process 700 verifies the seller-attested eMortgage data (e.g., from stage 705) against the eMortgage data (e.g., from stage 715) according to the verification rules. In various embodiments, at least a portion of the functionality of this stage may be implemented using a machine, such as a programmed general purpose computer, that compares digital data in data fields of the seller-attested eMortgage data to digital data in the corresponding data fields of an electronic eMortgage document, such as the eNote to determine whether the data corresponds, matches, or is substantially the same, perhaps within tolerances specified by the verification rules. For example, a computerized system may compare 25 data fields from the seller-attested eMortgage data to the corresponding 25 data fields from the eNote of the eMortgage, and determine whether the fields correspond or match, perhaps within a specified tolerance.

In various embodiments, a portion of the functionality of this stage may be implemented using a computerized machine that compares digital data in data fields of the seller-attested eMortgage data to corresponding digital data obtained from information sources other than the electronic documents of the eMortgage, such as digital date obtained from the MERS® eRegistry, from the lender or other seller of the eMortgage, from a paper loan document custodian, etc.

In various embodiments, a portion of the functionality of this stage may also compare information from an information source other than the seller-attested eMortgage data to corresponding digital data obtained from another information source other than the seller-attested eMortgage data. Such information sources may include the MERS® eRegistry, the lender or other seller of the eMortgage, the purchaser, the eMortgage documents, the eVault, etc. For example, stage 720 may compare the tamper seal value (e.g., hash value) from the eNote in the eVault to the tamper seal value for that eNote that is recorded with the MERS® eRegistry, to verify that the tamper seal values are the same, which indicates that the eNote stored in the eVault is the same eNote that was registered with the MERS® eRegistry. For another example, before utilizing the information in an eNote, stage 720 may verify that the eNote has not been changed or tampered with since it was tamper sealed, using, for example, digital signature technology, as is well known in the cryptographic and computer security arts.

At stage 725, process 700 accesses the terms of business associated with the sale of the eMortgage. In various embodiments, the terms of business may be authoritative information from the purchaser of the eMortgage that describes or is otherwise related to the transactions associated with the eMortgage, such as the origination transaction, the sales transaction, etc. For example, the terms of business may include criteria or requirements that the lender must have complied with in creating the eMortgage loan, such as criteria from a standardized set of guidelines (e.g., the Freddie Mac "Single-Family Seller/Servicer Guide") and/or criteria that are customized for and/or negotiated with a lender or originator. For example, a term of business may be that the lender may charge to the borrower no more than a specified limited dollar amount as an origination fee, an underwriting fee, an application fee, or the like. A term of business is a variance from the standard guidelines, (e.g., a variance from the Freddie Mac Seller/Servicer "Guide"), which is negotiated between the lender 510 and the purchaser 540, such as Freddie Mac. An example of a negotiated term of business is where the seller of the loan (e.g., lender 510) is permitted to submit a loan to an automated underwriting system (e.g., Freddie Mac's Loan Product Advisor™) after the loan is closed.

In some embodiments, a document custodian, such as document custodian 560 of FIG. 5, may access the terms of business by receiving, reading, requesting, downloading, accepting, or otherwise obtaining access to the terms of business from the purchaser 540 and/or the investing system 545.

As shown in the example of FIG. 7, process 700 next verifies that the eMortgage complies or corresponds with the terms of business (stage 730). In various embodiments, at least a portion of the functionality of this stage may be implemented using a machine, such as a programmed general purpose computer, that compares digital data in data fields of the seller-attested eMortgage data to digital data in the corresponding data fields of an electronic eMortgage document, such as an electronic federal closing disclosure statement (or an electronic image of a paper hybrid eMortgage document), to determine whether the data corresponds or matches (e.g., is substantially the same), perhaps within tolerances specified by the terms of business. For example, an implementation of this stage may compare the origination fee and the underwriting fee from an electronic federal closing disclosure statement to dollar limits for these fees specified by the terms of business, and determine whether or not the charged fees exceeded the limits. For another example, an implementation of this stage may obtain creation-time data from an eNote and obtain storage-time information from the eVault that holds the eNote, compute the amount of time between creation and storage of the eNote, compare it to a time limit specified by the terms of business (e.g., 24 hours), and determine whether or not the lender complied with the terms of business for making the eNote available in the eVault for certification. For another example, an implementation of this stage may obtain the Note Date and ensure the date on the front of the eNote matches or is within an acceptable tolerance to the date it was signed. Yet another example would be a situation where the implementation of this stage may obtain specific loan data fields such as the loan number, property address and borrower name from an eNote and obtain comparable information from the investing system 545 (also known as the investor delivery system) and determine those items that do not match.

At stage 740, process 700 determines whether all the verifications of the seller-attested eMortgage data (stage 720) and the terms of business (stage 740) were satisfactory. If the verifications were satisfactory (stage 740, Yes), indicating that the eMortgage meets the conditions, criteria, and terms desired by the purchaser, then process 700 proceeds to stage 745 and provides certification that the eMortgage has passed the verification tests. In various embodiments, the certification may be in the form of an electronic document (e.g., an XML file) or transmission to the purchaser, where the document or transmission indicates that the seller-attested eMortgage data matches the actual eMortgage data and/or that the seller has complied with the terms of business. In some embodiments, the certification output by stage 745 may trigger completion of the purchase of an eMortgage by the purchaser 540 or the start of the purchase of an eMortgage by the purchaser 540.

If, on the other hand, the verifications were unsatisfactory (stage 740, No), indicating that the eMortgage does not meet at least one of the conditions, criteria, and terms desired by the purchaser, then process 700 proceeds to stage 750 and provides an indication of the problem(s) preventing certification. In various embodiments, the indication may be in the form or an electronic document (e.g., an XML file) or transmission to the purchaser, where the document or transmission indicates that the seller-attested eMortgage data does not match the actual eMortgage data and/or that the seller has not complied with the terms of business.

In some embodiments, the problem indication outputted by stage 750 may include an error message describing the verification problem, such as a message describing information in a data field in the seller-attested eMortgage data that is incorrect, and what that information should be, as indicated by an authoritative or trusted source of eMortgage information, such as the eNote or other actual eMortgage document. For example if any of the certifiable fields (e.g., as mentioned above with respect to stage 710) are missing or mismatched with respect to the seller-attested eMortgage data and an eMortgage document, such as the eNote, then the problem indication of stage 250 may include an error message specifying the mismatch. For instance, the problem indication may include an error message such as: "Investing System Loan Amount Value="$150,000 does not match eNote Loan Amount Value=$150,100," or "Seller-Attested eMortgage Data Missing: Balloon Maturity Date." Similarly, an error message may describe a malformation in a certifiable field, such as an invalid date format: "Seller-Attested eMortgage Data 'Loan Amount Value' is missing decimal places for currency=$150,000 and eNote 'Loan Amount Value'=$150,000.00" or "Investing System first payment due date not in format MM/DD/YYYY." Other error messages are also possible.

In various embodiments, process 700, or variations thereof, may be employed as part of eMortgage purchase process (e.g., after an eMortgage has been determined to meet certain purchase criteria, but before closing on the purchase), employed before the purchase of an eMortgage (e.g., to "prequalify" the eMortgage), or employed after the purchase of an eMortgage (e.g., to check whether the purchased eMortgage meets certain criteria).

In embodiments employed before the purchase of an eMortgage, the purchaser may decline to purchase the electronic loan if the certification process (e.g., process 700) indicates problems (e.g., stage 750). For example, in arrangements where underwriting tools have indicated the purchase eligibility of an eMortgage before the eMortgage's creation based on information supplied by the seller to an automated underwriting system (for example, the Loan Product Advisor® system by Freddie Mac), a certification process, such as process 700, may reveal that the information supplied to the automated underwriting system is different from the actual eMortgage loan as implemented. In such a scenario, the purchaser may decline to purchase the eMortgage.

In embodiments employed during the purchase of an eMortgage, the purchaser may decline to close the purchase of the electronic loan (e.g., not transfer payment to the seller and rescind the ongoing purchase) if the certification process (e.g., process 700) indicates problems (e.g., stage 750).

In embodiments employed after the purchase of an eMortgage, the verifications of process 700 may reveal problems that make the electronic loan ineligible for purchase by the purchaser, after the fact. In some such purchase arrangements, this may be termed a "repurchasable event," wherein the seller is obligated to repurchase the loan from purchaser because the loan does not meet the terms of the "Guide" or their contract. For example, if the seller attested, represented, or otherwise agreed that the purchased electronic loan did not include fees to the borrower that were above specified dollar limits (e.g., that the loan was not a "high cost" loan under the purchaser's guidelines or criteria), but the certification process (e.g., process 700) reveals that there were fees in the federal closing disclosure statement that exceed the specified dollar limits (e.g., that classify the loan as a "high cost" loan), then the seller is obligated under the purchase agreement to repurchase the electronic loan from the purchaser.

One of ordinary skill will recognize that example process 700 is presented for conciseness and clarity of explanation and that stages may be added to, deleted from, reordered, or modified within process 700 without departing from the principles of the invention. For example, stage 725 may be combined with stage 710 such that all the verification rules and business term criteria are obtained together, and similarly, stages 720 and 730 may be combined to implement all the verification checks together. For another example, as mentioned above, stages may be added to access information related to an eMortgage from additional information sources other than those shown in FIG. 7 and to verify that the information meets the conditions, rules, or other criteria required to certify the eMortgage.

Figure 8:
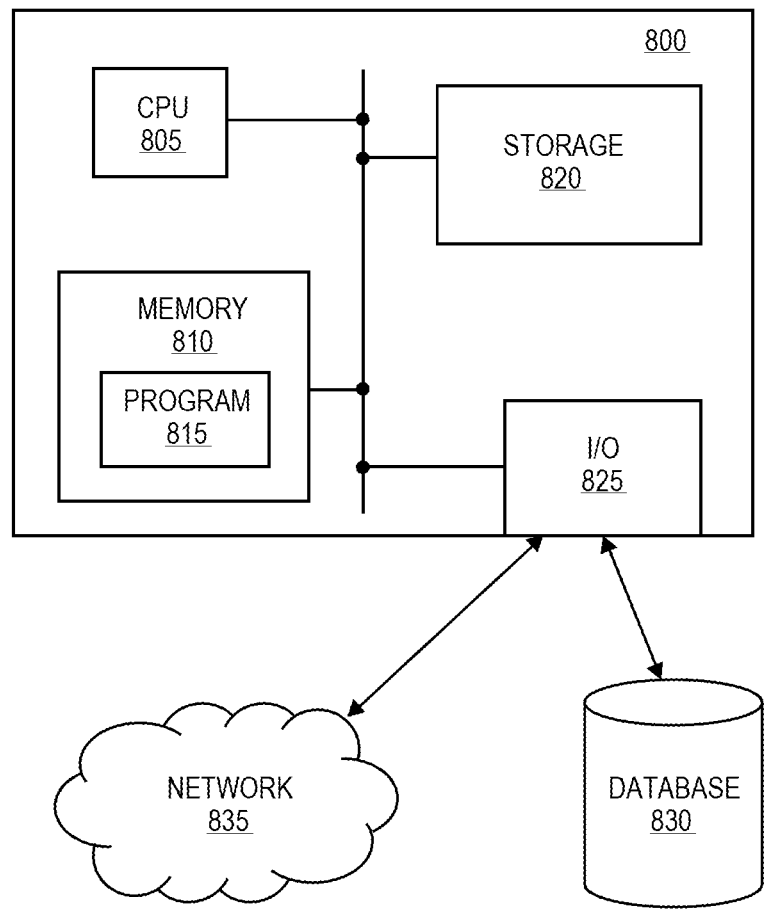
FIG. 8 is a block diagram of an example computing system useful for implementing systems consistent with embodiments of the invention.

FIG. 8 is a block diagram of an example computing system or data processing system 800 that may be used to implement embodiments consistent with the invention. Other components and/or arrangements may also be used. In some embodiments, computing system 800 may be used to implement, at least partially, various components of FIGS. 5 and 6, such as the document custodian 560 and/or the purchaser 540, and to implement, at least partially, process 600 of FIG. 6 and/or process 700 of FIG. 7, among other things.

Computing system 800 includes a number of components, such as a central processing unit (CPU) 805, a memory 810, an input/output (I/O) device(s) 825, and a nonvolatile storage device 820. System 800 can be implemented in various ways. For example, an implementation as an integrated platform (such as a server, workstation, personal computer, laptop, smart phone, etc.) may comprise CPU 805, memory 810, nonvolatile storage 820, and I/O devices 825. In such a configuration, components 805, 810, 820, and 825 may connect and communicate through a local data bus and may access a database 830 (implemented, for example, as a separate database system) via an external I/O connection. I/O component(s) 825 may connect to external devices through a direct communication link (e.g., a hardwired or local wifi connection), through a network, such as a local area network (LAN) or a wide area network (WAN), and/or through other suitable connections. System 800 may be standalone or it may be a subsystem of a larger system.

CPU 805 may be one or more known processing devices, such as a microprocessor from the Core™ 2 family manufactured by the Inter™ Corporation of Santa Clara, CA or a microprocessor from the Athlon™ family manufactured by the AMD™ Corporation of Sunnyvale, CA. Memory 810 may be one or more fast storage devices configured to store instructions and information used by CPU 805 to perform certain functions, methods, and processes related to embodiments of the present invention. Storage 820 may be a volatile or non-volatile, magnetic, semiconductor, tape, optical, or other type of storage device or computer-readable medium, including devices such as CDs and DVDs, meant for long-term storage.

In the illustrated embodiment, memory 810 contains one or more programs or subprograms 815 loaded from storage 820 or from a remote system (not shown) that, when executed by CPU 805, perform various operations, procedures, processes, or methods consistent with the present invention. Alternatively, CPU 805 may execute one or more programs located remotely from system 800. For example, system 800 may access one or more remote programs via network 835 that, when executed, perform functions and processes related to embodiments of the present invention.

In one embodiment, memory 810 may include a program(s) 815 for certifying loan information that implements at least a portion of process 600 of FIG. 6, and/or a program 815 for certifying loan information that implements at least a portion of process 700 of FIG. 7. In some embodiments, memory 810 may also include other programs or applications that implement other methods and processes that provide ancillary functionality to the invention. For example, memory 810 may include programs that access, gather, organize, store, and/or generate invention-related data, such as certification reports, verification problem reports, seller-attested data, electronic mortgage documents, eNotes, images of paper documents, eMortgage process data, timing data, etc.

Memory 810 may also be configured with other programs (not shown) unrelated to the invention and/or an operating system (not shown) that performs several functions well known in the art when executed by CPU 805. By way of example, the operating system may be Microsoft Windows®, Unix®, Linux®, an Apple Computers® operating system, Personal Digital Assistant operating system such as Microsoft CE®, or other operating system. The choice of operating system, and even the use of an operating system, is not critical to the invention.

I/O device(s) 825 may comprise one or more input/output devices that allow data to be received and/or transmitted by system 800. For example, I/O device 825 may include one or more input devices, such as a keyboard, touch screen, mouse, and the like, that enable data to be input from a user. Further, I/O device 825 may include one or more output devices, such as a display screen, CRT monitor, LCD monitor, plasma display, printer, speaker devices, and the like, that enable data to be output or presented to a user. I/O device 825 may also include one or more digital and/or analog communication input/output devices that allow computing system 800 to communicate, for example, digitally, with other machines and devices. Other configurations and/or numbers of input and/or output devices may be incorporated in I/O device 825.

In the embodiment shown, system 800 is connected to a network 835 (such as the Internet, a private network, a virtual private network, or other network), which may in turn be connected to various systems and computing machines (not shown), such as servers, personal computers, laptop computers, client devices, etc. In general, system 800 may input data from external machines and devices and output data to external machines and devices via network 835.

In the example embodiment shown in FIG. 8, database 830 is a standalone database external to system 800. In other embodiments, database 830 may be hosted by system 800. In various embodiments, database 830 may manage and store data used to implement systems and methods consistent with the invention. For example, database 830 may manage and store data structures that contain certification reports, verification problem reports, seller-attested data, electronic mortgage documents, eNotes, images of paper documents, eMortgage process data, timing data, verification rules, terms of business, standard guidelines, etc.

Database 830 may comprise one or more databases that store information and are accessed and/or managed through system 800. By way of example, database 830 may be an Oracle® database, a Sybase® database, or other relational database. Systems and methods consistent with the invention, however, are not limited to separate data structures or databases, or even to the use of a database or data structure.

One of ordinary skill will recognize that the components and implementation details of the system in FIG. 8 are examples presented for conciseness and clarity of explanation. Other components and implementation details may be used.

Although many of the embodiments and implementations in this disclosure are described in the context of mortgage loans, the scope of the invention is not limited to mortgage loans and includes other types of loans, including vehicle loans, margin loans, etc. In addition, although many of the embodiments and implementations in this disclosure are described in the context of electronic mortgage documents and information (eNotes, electronic loan application documents, electronic federal closing disclosure statements, etc.), the scope of the invention is not limited to electronic mortgage documents and information and includes other types of electronic documents and information involved with business transactions, such as deeds, titles, securities, etc.

In addition, although many of the embodiments and implementations in this disclosure are described in the context of seller-provided data that is created at the closing of a loan, the scope of the invention includes data that is created before the loan closing, including pre-approval data that is created by the lender to describe the loan to an investor's automated underwriting system, (e.g., Freddie Mac's Loan Product Advisor® system), which generates an indication concerning the purchase eligibility of the loan before the loan is created. Embodiments of this type may verify data entered into the investor's purchase pre-approval system with respect to the information and data from the actual, later-created eMortgage loan.

Other embodiments of the invention will be apparent to those skilled in the art from consideration of the specification and practice of the invention disclosed herein. It is intended that the specification and examples be considered as example only, with a true scope and spirit of the invention being indicated by the following claims.

What is claimed is:

1. A system for database and file management comprising:
a data management device comprising:
one or more processors; and
a memory device storing instructions that, in response to execution by the one or more processors, causes the one or more processors to perform operations comprising:
creating a request comprising unauthenticated data for validation;
securely transmitting the request to a remote device;
updating metadata corresponding to the request to indicate a successful validation by the remote device;
receiving a response file from the remote device;
validating the response file;
detecting, from the response file, a discrepancy between the unauthenticated data from the request and authenticated data accessible by the remote device;
obtaining correction data to resolve the discrepancy;
verifying the correction data; and
executing a transaction based on the request and the correction data;

wherein the remote device comprises a second processor to perform operations comprising:
applying a data security technique to verify that the authenticated data has not been modified by an unauthorized user;
generating a database table based on one or more fields of the authenticated data;
extracting one or more predetermined data values from the authenticated data;
extracting one or more predetermined data values from the database table; and
validating the unauthenticated data in the request based on a comparison of the extracted one or more predetermined data values from the authenticated data and the extracted one or more predetermined data values from the database table to the unauthenticated data in the request.

2. The system of claim 1, wherein the operation of securely transmitting the request to the remote device is performed using at least one of a representational state transfer (REST) application programming interface (API) or a simple object access protocol (SOAP).

3. The system of claim 1, wherein the second processor is to further perform operations comprising:
generating the response file based on one or more fields of the validated unauthenticated data; and
transmitting the response file via a representational state transfer (REST) application programming interface (API) to the data management device, wherein the response file is based on the request.

4. The system of claim 1, wherein the second processor is to further perform operations comprising generating the response file comprising the discrepancy based on a difference between the unauthenticated data from the request and the extracted one or more predetermined data values.

5. The system of claim 1, wherein the one or more processors perform operations further comprising:
generating a set of error code values corresponding to the validation of the unauthenticated data from the request;
detecting an error from the validation of the response file; and
selecting an error code from the set of error codes associated with the error.

6. The system of claim 1, wherein the request comprises data for multiple transactions.

7. The system of claim 1, wherein an interpreted scripting language object on which the request is based comprises data stored in a JavaScript® object notation.

8. The system of claim 1, wherein the response file includes a system identifier that authenticates the remote device in order to protect against an unauthorized device that falsely transmits a response file, the system identifier including any suitable string of alphanumeric characters that is unique to the remote device.

9. A method, implemented using a computing system, for database and file management, the method comprising:
creating a request comprising unauthenticated data for validation;
securely transmitting the request to a remote device;
updating metadata corresponding to the request to indicate a successful validation by the remote device;
receiving a response file from the remote device;
validating the response file;
detecting, from the response file, a discrepancy between the unauthenticated data from the request and authenticated data accessible by the remote device;
obtaining correction data to resolve the discrepancy;

verifying the correction data; and
executing a transaction based on the request and the correction data;
wherein the remote device comprises a second processor to perform operations comprising:
applying a data security technique to verify that the authenticated data has not been modified by an unauthorized user;
generating a database table based on one or more fields of the authenticated data;
extracting one or more predetermined data values from the authenticated data;
extracting one or more predetermined data values from the database table; and
validating the unauthenticated data in the request based on a comparison of the extracted one or more predetermined data values from the authenticated data and the extracted one or more predetermined data values from the database table to the unauthenticated data in the request.

10. The method of claim 9, wherein the securely transmitting the request to the remote device is performed using at least one of a representational state transfer (REST) application programming interface (API) or a simple object access protocol (SOAP).

11. The method of claim 9, further comprising:
generating the response file based on one or more fields of the validated unauthenticated data; and
transmitting the response file via a representational state transfer (REST) application programming interface (API), wherein the response file is based on the request.

12. The method of claim 9, further comprising generating the response file comprising the discrepancy based on a difference between the unauthenticated data from the request and the extracted one or more predetermined data values.

13. The method of claim 9, further comprising:
generating a set of error code values corresponding to the validation of the unauthenticated data from the request;
detecting an error from the validation of the response file; and
selecting an error code from the set of error codes associated with the error.

14. The method of claim 9, wherein the request comprises data for multiple transactions.

15. The method of claim 9, wherein an interpreted scripting language object on which the request is based comprises data stored in a JavaScript® object notation.

16. The method of claim 9, wherein the response file includes a system identifier that authenticates the remote device in order to protect against an unauthorized device that falsely transmits a response file, the system identifier including any suitable string of alphanumeric characters that is unique to the remote device.

17. A non-transitory computer-readable medium for database and file management comprising a plurality of instructions that, when executed by a processor, cause the processor to perform operations comprising:
creating a request comprising unauthenticated data for validation;
securely transmitting the request to a remote device;
updating metadata corresponding to the request to indicate a successful validation by the remote device;
receiving a response file from the remote device;
validating the response file;
detecting, from the response file, a discrepancy between the unauthenticated data from the request and authenticated data accessible by the remote device;
obtaining correction data to resolve the discrepancy;
verifying the correction data; and
executing a transaction based on the request and the correction data;
wherein the remote device comprises a second processor to perform operations comprising:
applying a data security technique to verify that the authenticated data has not been modified by an unauthorized user;
generating a database table based on one or more fields of the authenticated data;
extracting one or more predetermined data values from the authenticated data;
extracting one or more predetermined data values from the database table; and
validating the unauthenticated data in the request based on a comparison of the extracted one or more predetermined data values from the authenticated data and the extracted one or more predetermined data values from the database table to the unauthenticated data in the request.

18. The non-transitory computer-readable medium of claim 17, wherein securely transmitting the request to the remote device is performed via a representational state transfer (REST) application programming interface (API) or a simple object access protocol (SOAP).

19. The non-transitory computer-readable medium of claim 17, wherein the second processor is to further perform operations comprising:
generating the response file based on one or more fields of the validated unauthenticated data; and
transmitting the response file via a representational state transfer (REST) application programming interface (API), wherein the response file is based on the request.

20. The non-transitory computer-readable medium of claim 17, wherein the response file includes a system identifier that authenticates the remote device in order to protect against an unauthorized device that falsely transmits a response file, the system identifier including any suitable string of alphanumeric characters that is unique to the remote device.

* * * * *